United States Patent
Okuda et al.

(10) Patent No.: US 9,007,042 B2
(45) Date of Patent: Apr. 14, 2015

(54) DC/DC CONVERTER

(75) Inventors: Tatsuya Okuda, Tokyo (JP); Takahiro Urakabe, Tokyo (JP); Masaru Kobayashi, Tokyo (JP); Matahiko Ikeda, Tokyo (JP); Hirotoshi Maekawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 13/811,505

(22) PCT Filed: Jul. 27, 2011

(86) PCT No.: PCT/JP2011/067033
§ 371 (c)(1),
(2), (4) Date: Jan. 22, 2013

(87) PCT Pub. No.: WO2012/014912
PCT Pub. Date: Feb. 2, 2012

(65) Prior Publication Data
US 2013/0119961 A1 May 16, 2013

(30) Foreign Application Priority Data

Jul. 30, 2010 (JP) .................................. 2010-171568

(51) Int. Cl.
*G05F 1/00* (2006.01)
*G05F 5/00* (2006.01)
(Continued)

(52) U.S. Cl.
CPC ................. *G05F 5/00* (2013.01); *H02M 3/158* (2013.01); *H02M 1/32* (2013.01); *H02M 3/1588* (2013.01); *Y02B 70/1466* (2013.01)

(58) Field of Classification Search
CPC .................................. G05F 5/00; H02M 3/158

USPC .................. 323/222–225, 268, 271, 282–285
See application file for complete search history.

(56) References Cited

U.S. PATENT DOCUMENTS 4,669,039 A 5/1987 Brakus
5,771,163 A 6/1998 Moriguchi et al.
(Continued)

FOREIGN PATENT DOCUMENTS

JP 61 92162 5/1986
JP 62-081978 A 4/1987
(Continued)

OTHER PUBLICATIONS

International Search Report Issued Nov. 1, 2011 in PCT/JP11/67033 Filed Jul. 27, 2011.
(Continued)

*Primary Examiner* — Matthew Nguyen
(74) *Attorney, Agent, or Firm* — Oblon, McClelland, Maier & Neustadt, L.L.P.

(57) ABSTRACT

In a DC/DC converter, a first operation section calculates a first operation value, based on a difference voltage between an instruction value for a high-voltage-side voltage and a detected value of a high-voltage-side voltage, a second operation section calculates a second operation value, based on a difference voltage between a voltage instruction value for a charge-discharge capacitor and a voltage detected value of the charge-discharge capacitor, and a switching control section obtains a conduction ratio, based on the first operation value and the second operation value, and controls, based on the conduction ratio, switching operations of first to fourth semiconductor circuits, thereby controlling the high-voltage-side voltage, and the voltage of the charge-discharge capacitor.

21 Claims, 26 Drawing Sheets

(51) Int. Cl.
*H02M 3/158* (2006.01)
*H02M 1/32* (2007.01)

(56) References Cited

U.S. PATENT DOCUMENTS

| | | | | |
|---|---|---|---|---|
| 7,688,048 | B2 * | 3/2010 | Nielsen | 323/268 |
| 7,965,069 | B2 * | 6/2011 | Watanabe et al. | 323/284 |
| 8,773,082 | B2 * | 7/2014 | Urakabe et al. | 323/225 |
| 2004/0233685 | A1 | 11/2004 | Matsuo et al. | |
| 2005/0174098 | A1 | 8/2005 | Watanabe et al. | |
| 2012/0126764 | A1 | 5/2012 | Urakabe et al. | |
| 2013/0002215 | A1 * | 1/2013 | Ikeda et al. | 323/271 |

FOREIGN PATENT DOCUMENTS

| | | |
|---|---|---|
| JP | 9 84333 | 3/1997 |
| JP | 2005 224060 | 8/2005 |
| JP | 2008 295228 | 12/2008 |

OTHER PUBLICATIONS

U.S. Appl. No. 13/520,914, filed Jul. 6, 2012, Okuda et al.

Office Action issued May 6, 2014 in German Patent Application No. 11 2011 102 550.5 (with English language translation).

Fan Zhang, et al., "Study of the Multilevel Converters in DC-DC Applications" $35^{th}$ Annual IEEE Power Electronics Specialists Conference, vol. 2, Jun. 20-25, 2004, pp. 1702-1706.

Fang Z. Peng, et al., "A Novel Compact DC-DC Converter for 42 V Systems" $34^{th}$ Annual IEEE Power Electronics Specialist Conference, vol. 1, Jun. 15-19, 2003, pp. 33-38.

* cited by examiner

US 9,007,042 B2

DC/DC CONVERTER

TECHNICAL FIELD

The present invention relates to a DC/DC converter.

BACKGROUND ART

Some conventional DC/DC converters control the amount of energy to be stored or released in a reactor by using ON/OFF operation of a semiconductor switch, thereby performing conversion to a higher voltage than that of a DC power supply. In addition, in response to a problem that the reactor is large and heavy, a technique is proposed which reduces a voltage applied to the reactor by using charge and discharge of a capacitor and reduces an inductance value needed for the reactor, thereby reducing the size and the weight of the reactor. In one of such techniques, a DC voltage conversion section is provided between a reactor L connected to a DC power supply, and a smoothing capacitor C0 for the output voltage, and the DC voltage conversion section has: a series circuit composed of a switching device series circuit having first and second switching devices S1 and S2 connected in series, and a diode series circuit having diodes D1 and D2 connected in series, such that the switching device S1, the switching device S2, the diode D1, and the diode D2 are connected in series in this order, the anode side of the diode D1 being connected to the second switching device S2; and a charge-discharge capacitor C1. The charge-discharge capacitor C1 is connected between the connection part between the diode D2 and the diode D1, and the connection part between the switching device S2 and the switching device S1. The connection part between the switching device S2 and the diode D1 is connected to the DC power supply via the reactor L. The series circuit and the smoothing capacitor C0 are connected in parallel. The charge-discharge capacitor C1 is charged via the diode D1 by the first switching device S1 being turned on. The charge-discharge capacitor C1 discharges via the diode D2 by the second switching device S2 being turned on. The discharge current is given to the smoothing capacitor C0. The switching devices S1 and S2 are alternately turned on, thereby obtaining a voltage two times as high as that of the DC power supply (for example, see Patent Document 1).

CITATION LIST

Patent Document

Patent Document 1: Japanese Laid-Open Patent Publication No. 61-092162

SUMMARY OF THE INVENTION

Problems to be Solved by the Invention

In a conventional DC/DC converter configured as described above, in the case where a circuit loss component occurs in the switching devices, the diodes, the reactor, or the like composing the DC voltage conversion section, or an error factor such as variation in ON times of the switching devices occurs, since the inter-terminal voltage of the charge-discharge capacitor C1 varies from zero to an output voltage Vo owing to the error factor, there is a problem that a ripple current in the reactor increases and the loss increases. Further, if the inter-terminal voltage of the charge-discharge capacitor C1 varies, since voltages applied to the semiconductor devices such as the switching devices are unbalanced, the semiconductor devices can be broken owing to overvoltage. For example, if the inter-terminal voltage of the charge-discharge capacitor C1 decreases, voltages applied to the switching device S1 and the diode D2 increase, and on the other hand, if the inter-terminal voltage of the charge-discharge capacitor C1 increases, voltages applied to the switching device S2 and the diode D1 increase. In addition, if regenerative power flows from the high-voltage-side terminal of the DC/DC converter and the output voltage Vo increases owing to the regenerative power, since the whole increased voltage of the output voltage Vo is applied to the switching device S1 and the diode D2, the switching device S1 as a semiconductor circuit having switching function and the diode D2 can be broken owing to overvoltage.

In order to prevent such trouble, the breakdown voltage of the switching devices and the diodes needs to be higher than the maximum value of the output voltage, and as a result, the cost unnecessarily increases and the efficiency reduces.

The present invention has been made to solve the above problems, and an object of the present invention is to obtain a DC/DC converter that can prevent overvoltage breakdown of a semiconductor circuit having switching function in the DC/DC converter.

Solution to the Problems

A DC/DC converter according to the present invention comprises: a low-voltage-side smoothing capacitor which retains a low-voltage-side voltage; a high-voltage-side smoothing capacitor whose negative terminal is connected to the negative terminal of the low-voltage-side smoothing capacitor and which retains a high-voltage-side voltage; a first semiconductor circuit one end of which is connected to the negative terminal of the low-voltage-side smoothing capacitor; a second semiconductor circuit one end of which is connected to the other end of the first semiconductor circuit, and the other end of which is connected to the positive terminal of the low-voltage-side smoothing capacitor via a reactor; a third semiconductor circuit one end of which is connected to the other end of the second semiconductor circuit; a fourth semiconductor circuit one end of which is connected to the other end of the third semiconductor circuit, and the other end of which is connected to the positive terminal of the high-voltage-side smoothing capacitor; an intermediate capacitor one end of which is connected to an intermediate connection point between the first semiconductor circuit and the second semiconductor circuit, and the other end of which is connected to an intermediate connection point between the third semiconductor circuit and the fourth semiconductor circuit; and a control apparatus which controls each of the semiconductor circuits. The DC/DC converter is configured to: cause each of the first and second semiconductor circuits to have function as switching device, and each of the third and fourth semiconductor circuits to have function as diode device; and perform step-up operation of converting the voltage of the low-voltage-side smoothing capacitor that is inputted, to a stepped-up voltage, and outputting the stepped-up voltage to the high-voltage-side smoothing capacitor, by using ON/OFF switching function as switching device that the first and second semiconductor circuits have, and/or the DC/DC converter is configured to: cause each of the third and fourth semiconductor circuits to have function as switching device, and each of the first and second semiconductor circuits to have function as diode device; and perform step-down operation of converting the voltage of the high-voltage-side smoothing capacitor that is inputted, to a stepped-down voltage, and outputting the stepped-down voltage to the low-voltage-side smoothing capacitor, by using ON/OFF switching function as switching device that the third and fourth semiconductor circuits have. The control apparatus has a first operation section, a second operation section, and a switching control section. The first operation section calculates a first operation value, based on a difference voltage between an instruction value for the high-voltage-side voltage and a detected value of the high-voltage-side voltage, or a difference voltage between an instruction value for the low-voltage-side voltage and a detected value of the low-voltage-side voltage. The second operation section calculates a second operation value, based on a difference voltage between a voltage instruction value for the intermediate capacitor and a voltage detected value of the intermediate capacitor. The switching control section obtains a conduction ratio, based on the first operation value and the second operation value, and controls, based on the conduction ratio, switching operations of the first and second semiconductor circuits having the ON/OFF switching function or the third and fourth semiconductor circuits having the ON/OFF switching function, thereby controlling the high-voltage-side voltage or the low-voltage-side voltage, and the voltage of the charge-discharge capacitor.

Effect of the Invention

The DC/DC converter according to the present invention comprises: a low-voltage-side smoothing capacitor which retains a low-voltage-side voltage; a high-voltage-side smoothing capacitor whose negative terminal is connected to the negative terminal of the low-voltage-side smoothing capacitor and which retains a high-voltage-side voltage; a first semiconductor circuit one end of which is connected to the negative terminal of the low-voltage-side smoothing capacitor; a second semiconductor circuit one end of which is connected to the other end of the first semiconductor circuit, and the other end of which is connected to the positive terminal of the low-voltage-side smoothing capacitor via a reactor; a third semiconductor circuit one end of which is connected to the other end of the second semiconductor circuit; a fourth semiconductor circuit one end of which is connected to the other end of the third semiconductor circuit, and the other end of which is connected to the positive terminal of the high-voltage-side smoothing capacitor; an intermediate capacitor one end of which is connected to an intermediate connection point between the first semiconductor circuit and the second semiconductor circuit, and the other end of which is connected to an intermediate connection point between the third semiconductor circuit and the fourth semiconductor circuit; and a control apparatus which controls each of the semiconductor circuits. The DC/DC converter is configured to: cause each of the first and second semiconductor circuits to have function as switching device, and each of the third and fourth semiconductor circuits to have function as diode device; and perform step-up operation of converting the voltage of the low-voltage-side smoothing capacitor that is inputted, to a stepped-up voltage, and outputting the stepped-up voltage to the high-voltage-side smoothing capacitor, by using ON/OFF switching function as switching device that the first and second semiconductor circuits have, and/or the DC/DC converter is configured to: cause each of the third and fourth semiconductor circuits to have function as switching device, and each of the first and second semiconductor circuits to have function as diode device; and perform step-down operation of converting the voltage of the high-voltage-side smoothing capacitor that is inputted, to a stepped-down voltage, and outputting the stepped-down voltage to the low-voltage-side smoothing capacitor, by using ON/OFF switching function as switching device that the third and fourth semiconductor circuits have. The control apparatus has a first operation section, a second operation section, and a switching control section. The first operation section calculates a first operation value, based on a difference voltage between an instruction value for the high-voltage-side voltage and a detected value of the high-voltage-side voltage, or a difference voltage between an instruction value for the low-voltage-side voltage and a detected value of the low-voltage-side voltage. The second operation section calculates a second operation value, based on a difference voltage between a voltage instruction value for the intermediate capacitor and a voltage detected value of the intermediate capacitor. The switching control section obtains a conduction ratio, based on the first operation value and the second operation value, and controls, based on the conduction ratio, switching operations of the first and second semiconductor circuits having the ON/OFF switching function or the third and fourth semiconductor circuits having the ON/OFF switching function, thereby controlling the high-voltage-side voltage or the low-voltage-side voltage, and the voltage of the charge-discharge capacitor. Therefore, it becomes possible to prevent overvoltage breakdown of a semiconductor circuit having switching function.

DESCRIPTION OF EMBODIMENTS

Embodiment 1

Figure 1:
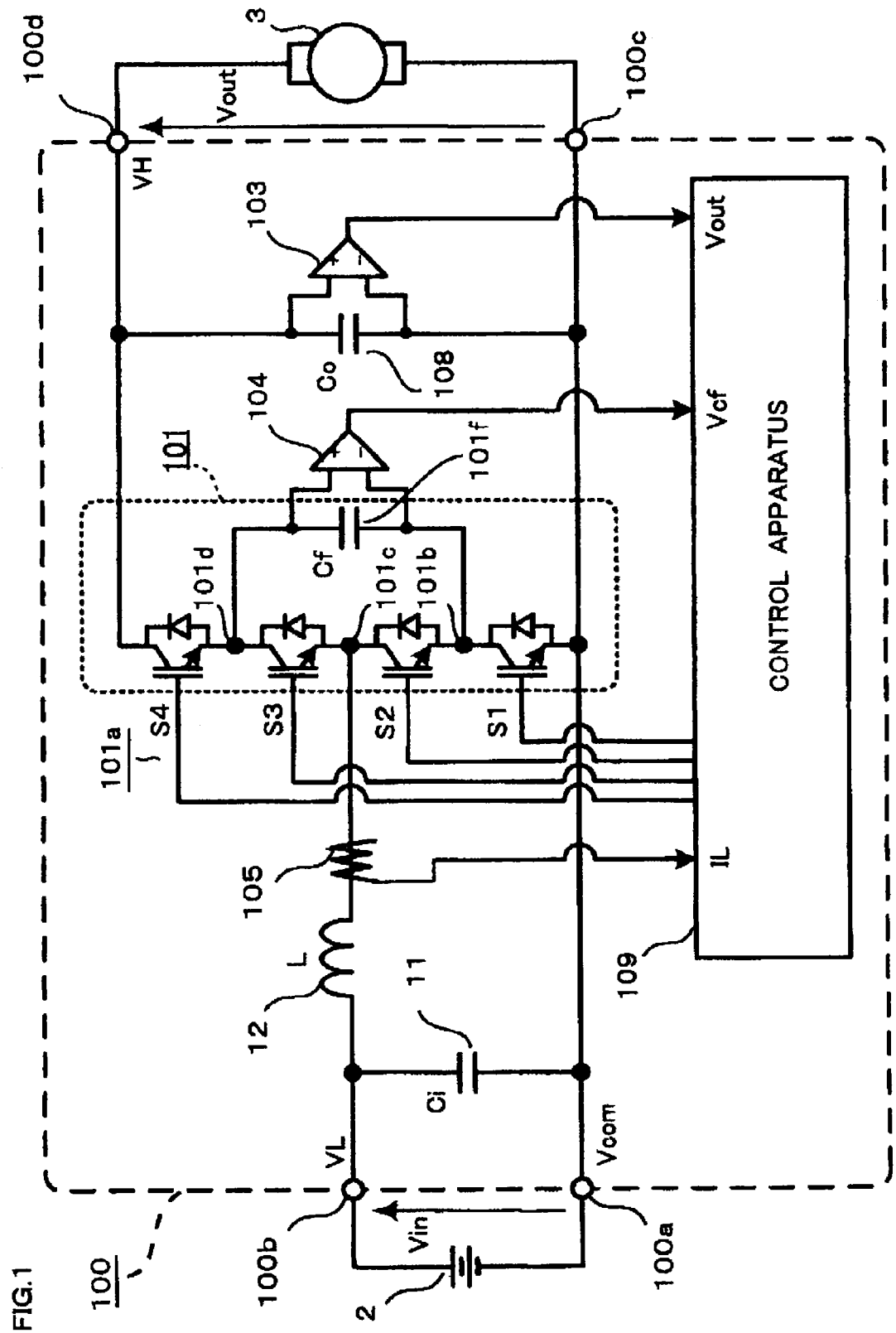
FIG. 1 is a configuration diagram showing the configuration of a DC/DC converter according to embodiment 1 of the present invention.
Figure 2:
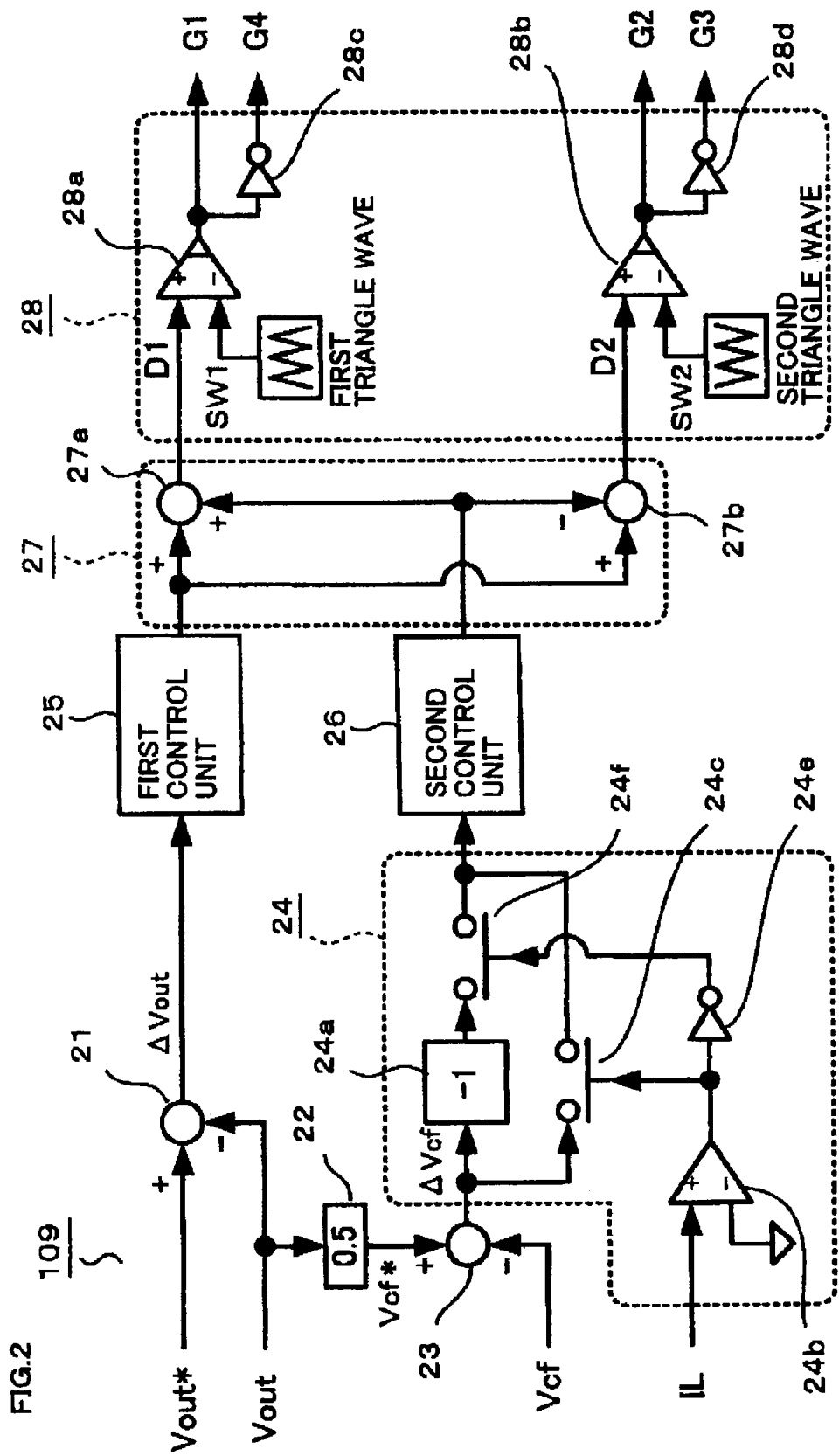
FIG. 2 is a circuit diagram showing the configuration of a control apparatus shown in FIG. 1.
Figure 3:
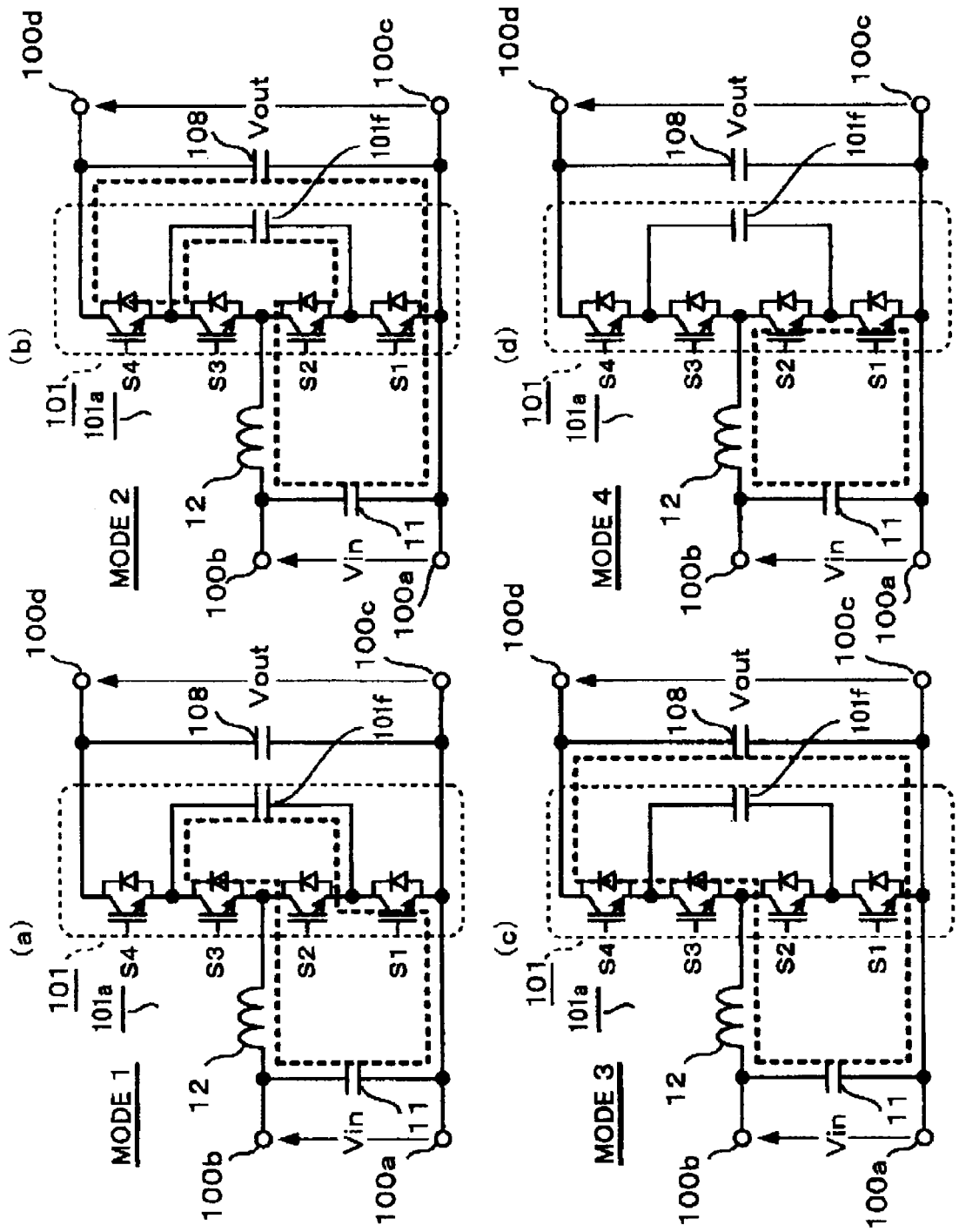
FIG. 3 is an explanation diagram showing operation modes of the DC/DC converter shown in FIG. 1.
Figure 6:
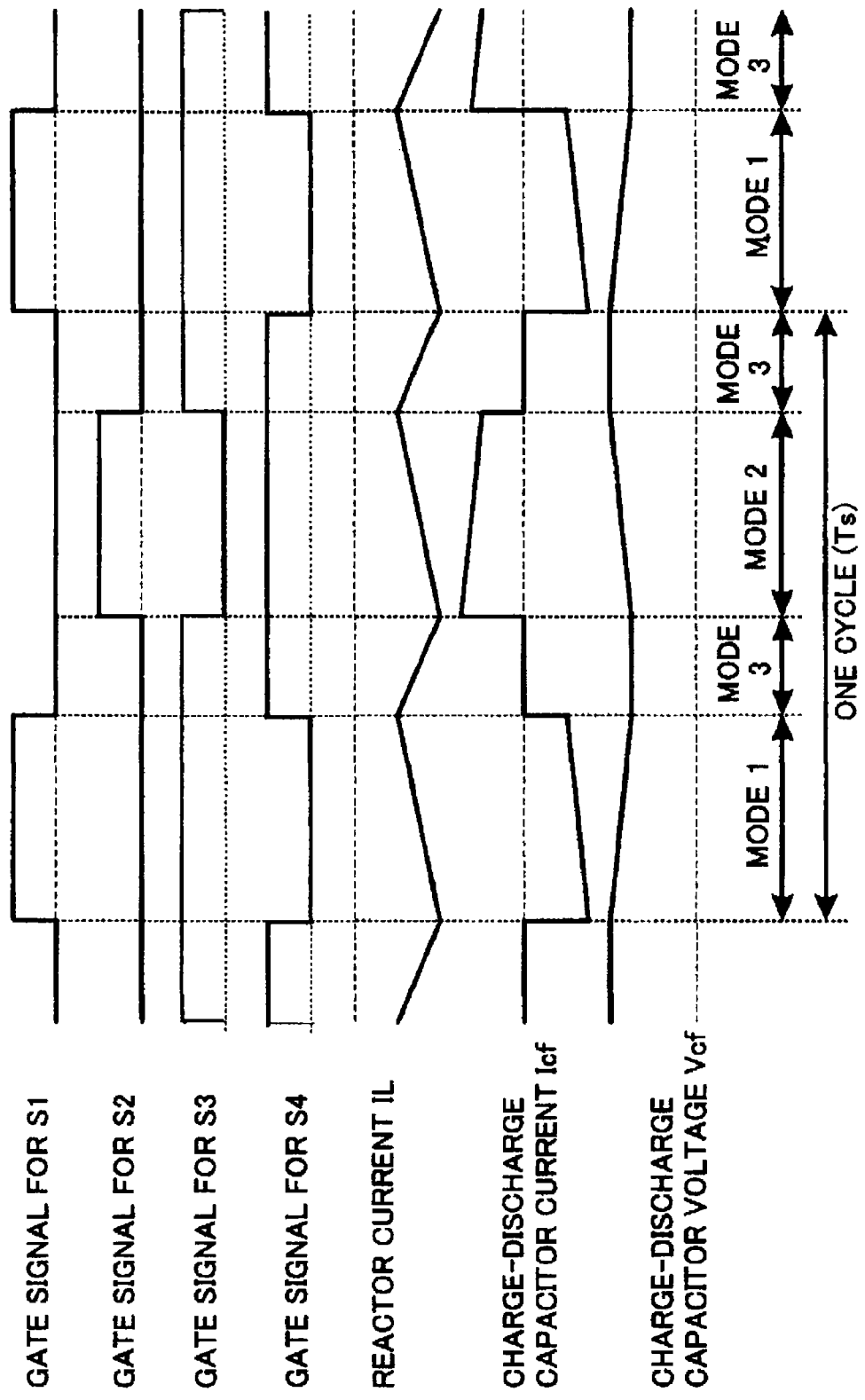
FIG. 6 is an operation explanation diagram of the DC/DC converter shown in FIG. 1.
Figure 7:
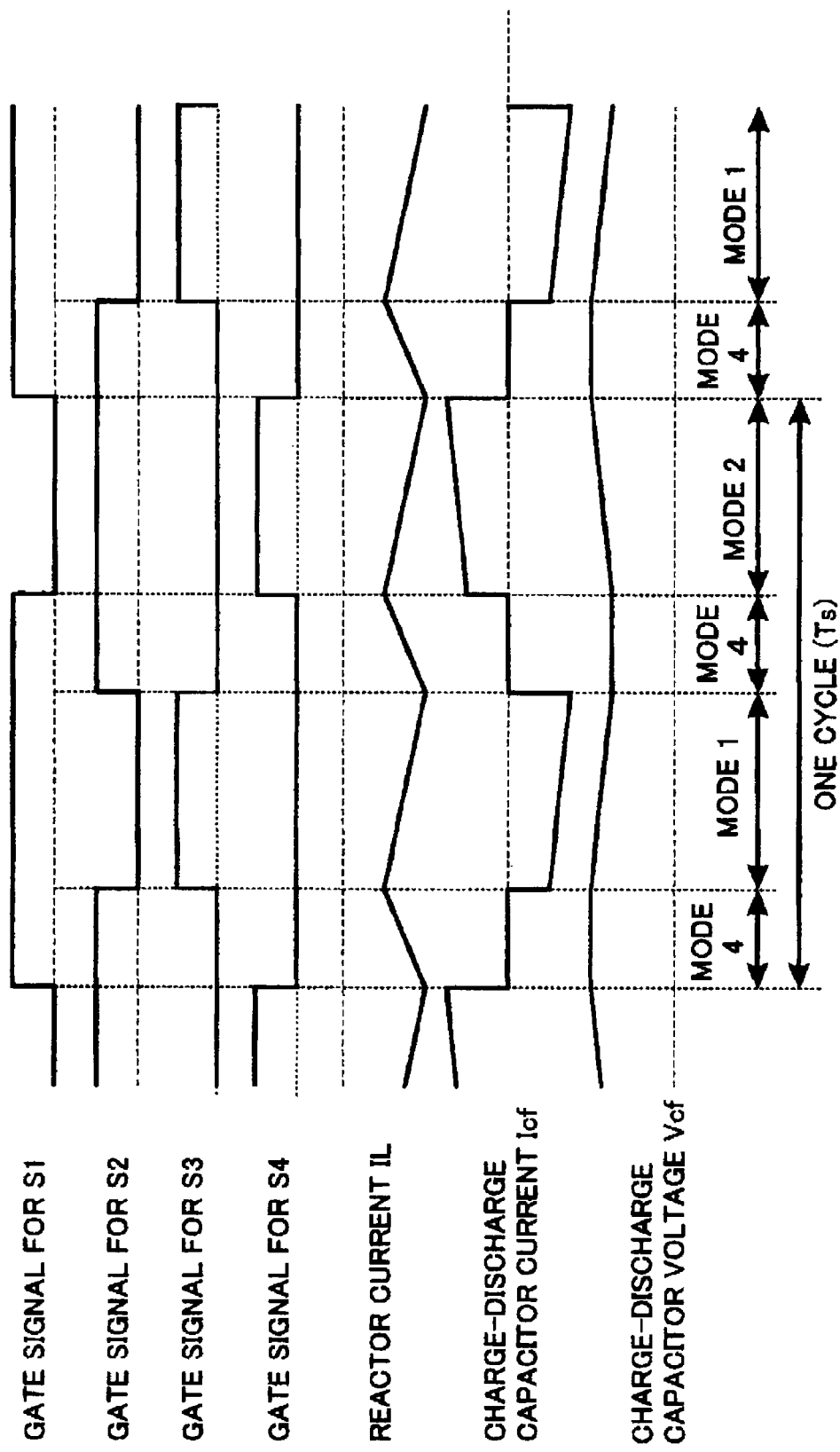
FIG. 7 is an operation explanation diagram of the DC/DC converter shown in FIG. 1.
Figure 8:
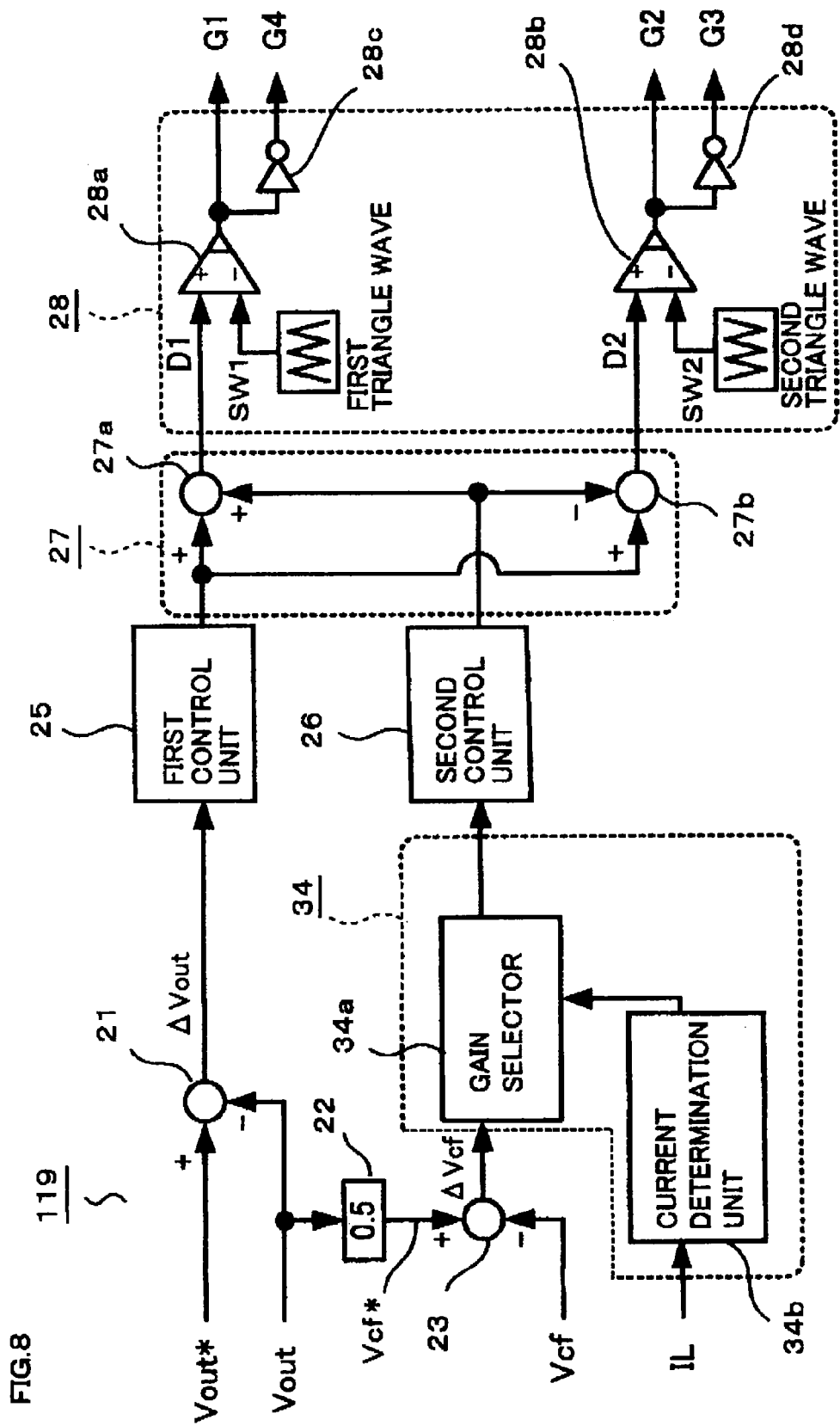
FIG. 8 is a circuit diagram showing the configuration of another control apparatus according to embodiment 1 of the present invention.
Figure 9:
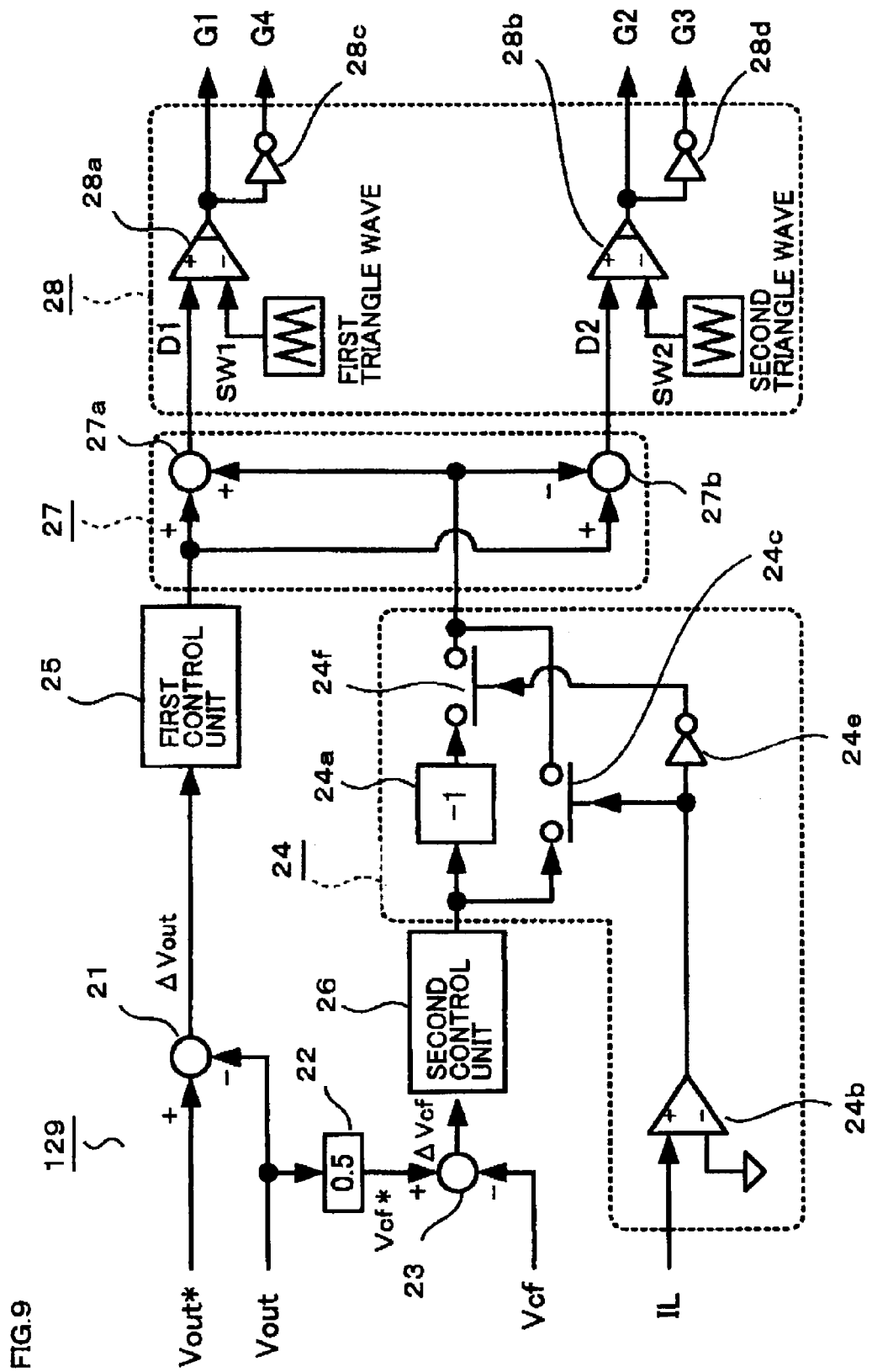
FIG. 9 is a circuit diagram showing the configuration of still another control apparatus according to embodiment 1 of the present invention.
Figure 10:
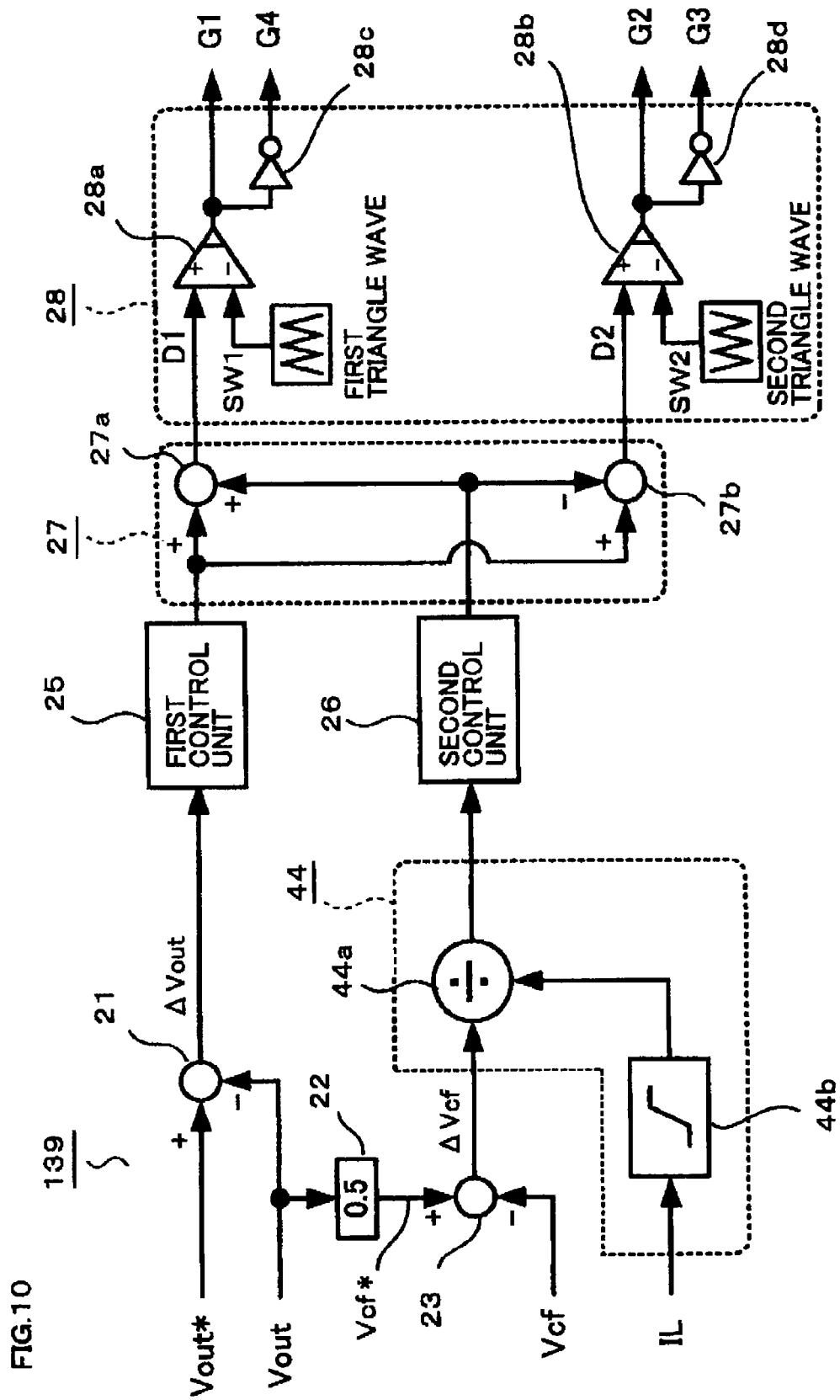
FIG. 10 is a circuit diagram showing the configuration of still another control apparatus according to embodiment 1 of the present invention.
Figure 11:
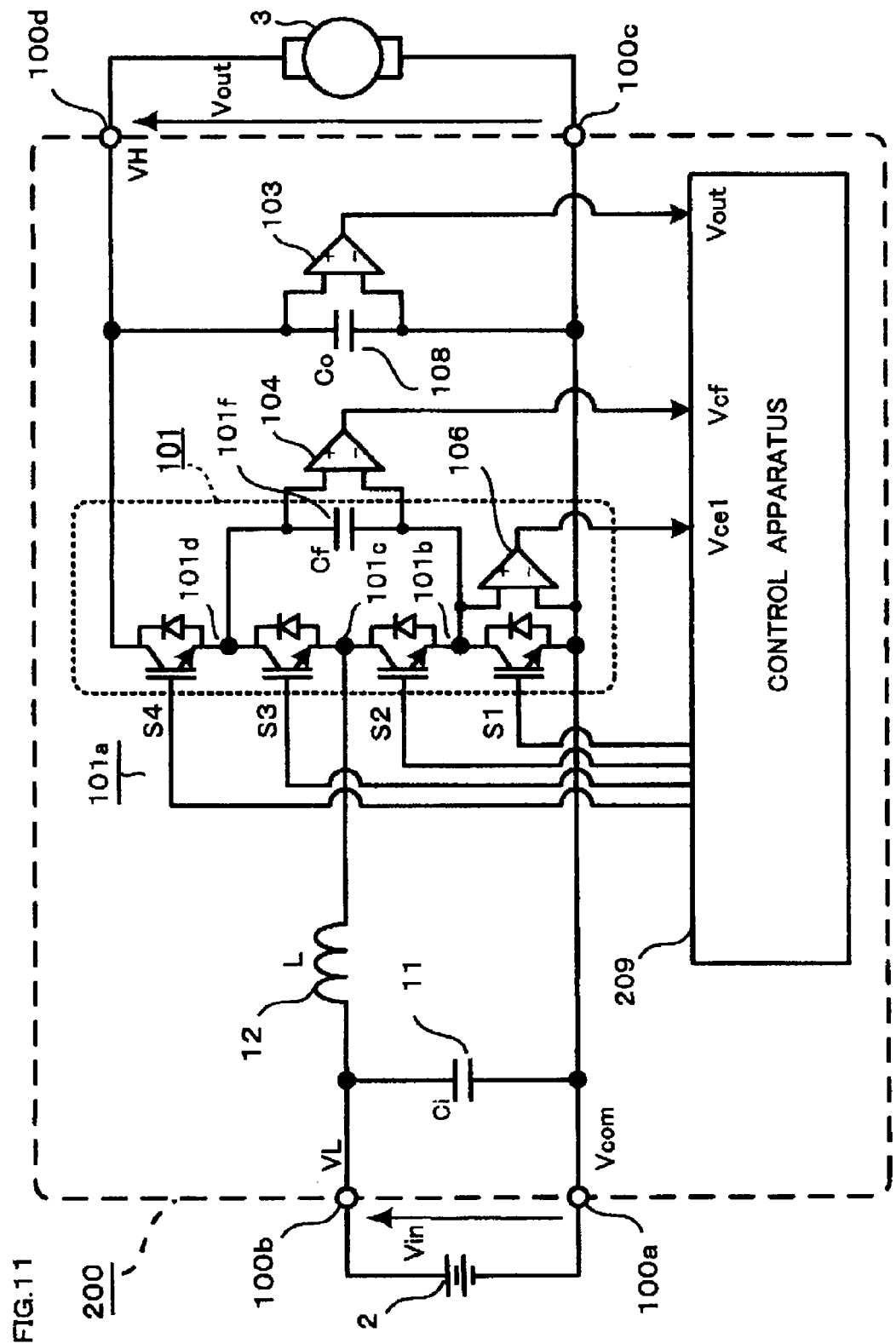
FIG. 11 is a configuration diagram showing the configuration of another DC/DC converter according to embodiment 1 of the present invention.

FIGS. 1 to 11 show embodiment 1 for implementing the present invention. FIG. 1 is a configuration diagram showing the configuration of a DC/DC converter, FIG. 2 is a circuit diagram showing the configuration of a control apparatus shown in FIG. 1, and FIG. 3 is an explanation diagram showing operation modes of the DC/DC converter shown in FIG. 1. FIGS. 4 to 7 are operation explanation diagrams of the DC/DC converter shown in FIG. 1. FIG. 8 is a circuit diagram showing the configuration of another control apparatus according to embodiment 1 of the present invention, FIG. 9 is a circuit diagram showing the configuration of still another control apparatus according to embodiment 1 of the present invention, FIG. 10 is a circuit diagram showing the configuration of still another control apparatus according to embodiment 1 of the present invention, and FIG. 11 is a configuration diagram showing the configuration of still another DC/DC converter according to embodiment 1 of the present invention.

In FIG. 1, a DC/DC converter 100 is of a bidirectional type capable of bidirectional power conversion between the low voltage side and the high voltage side, and has a first terminal 100a, a second terminal 100b, a third terminal 100c, and a fourth terminal 100d as a terminal group and as first, second, third, and fourth terminals, respectively. The DC/DC converter 100 steps up a DC input voltage Vin inputted between the first terminal 100a (Vcom) and the second terminal 100b (VL) which are low-voltage-side terminals, to a voltage equal to or higher than the input voltage Vin, and outputs the stepped-up voltage as an output voltage Vout, between the third terminal 100c (Vcom) and the fourth terminal 100d (VH) which are high-voltage-side terminals. In FIG. 1, a battery 2 is connected between the first terminal 100a and the second terminal 100b, and an electric motor 3 is connected between the third terminal 100c and the fourth terminal 100d. The DC/DC converter 100 has a low-voltage-side smoothing capacitor 11 (Ci) as a capacitor apparatus, a reactor 12 (L), a DC voltage conversion section 101, a voltage sensor 103, a voltage sensor 104, a current sensor 105, and a control apparatus 109.

The low-voltage-side smoothing capacitor 11 has one terminal connected to the first terminal 100a and the other terminal connected to the second terminal 100b, and smoothes the input voltage Vin. The first terminal 100a and the third terminal 100c are commonly connected. It is noted that the first terminal 100a and the third terminal 100c may be used in a shared manner. The reactor 12 (L) is used for storing energy, and connected to the second terminal 100b, and to a second connection part 101c (described later) which is the connection part between the switching device S2 and the switching device S3. The DC voltage conversion section 101 has a switching device series circuit 101a as a semiconductor-circuit series circuit, and a charge-discharge capacitor 101f (Cf), and steps up the input voltage Vin to the output voltage Vout. The switching device series circuit 101a is composed of four switching devices S1, S2, S3, and S4 as first to fourth semiconductor circuits which are connected in series in this order via first, second, and third connection parts 101b, 101c, and 101d, respectively. The switching devices S1 to S4 are each composed of, for example, IGBT (Insulated Gate Bipolar Transistor), and turn on when a gate signal is High, in the present embodiment. The charge-discharge capacitor 101f is connected to the first connection part 101b and the third connection part 101d.

The opposite side of the switching device S1 to the first connection part 101b is connected to the first terminal 100a, and the second connection part 101c is connected to the second terminal 100b via the reactor 12. The ends of the switching device series circuit 101a are respectively connected to the third terminal 100c and the fourth terminal 100d, and the first terminal 100a and the third terminal 100c are commonly connected. The first terminal 100a and the second terminal 100b are low-voltage-side terminals, and the third terminal 100c and the fourth terminal 100d are high-voltage-side terminals. More specifically, the emitter terminal of the switching device S1 is connected to the first terminal 100a, and the collector terminal of the switching device S4 is connected to the fourth terminal 100d. The second connection part 101c which is the connection part between the collector terminal of the switching device S2 and the emitter terminal of the switching device S3 is connected to the second terminal 100b via the reactor 12. In addition, the charge-discharge capacitor 101f has one terminal connected to the first connection part 101b which is the connection part between the collector terminal of the switching device S1 and the emitter terminal of the switching device S2, and the other terminal connected to the third connection part 101d which is the connection part between the collector terminal of the switching device S3 and the emitter terminal of the switching device S4.

The voltage sensor 103 detects the high-voltage-side output voltage, i.e., the inter-terminal voltage of a high-voltage-side smoothing capacitor 108 on the output side as a capacitor apparatus and as a high-voltage-side capacitor. The voltage sensor 104 detects a voltage Vcf (hereinafter, referred to as a charge-discharge capacitor voltage) of the charge-discharge capacitor 101f of the DC voltage conversion section 101. The current sensor 105 detects a reactor current IL flowing in the reactor 12. The high-voltage-side smoothing capacitor 108 on the output side smoothes the output voltage Vout which is a voltage stepped-up by the DC voltage conversion section 101. The control apparatus 109 generates gate signals for the four switching devices S1 to S4 in accordance with the detected values of the voltage sensors 103 and 104 and the current sensor 105, thereby causing the switching devices S1 to S4 of the DC voltage conversion section 101 to perform ON/OFF operation.

FIG. 2 is a circuit diagram showing the detailed configuration of the control apparatus 109. In FIG. 2, the control apparatus 109 has a subtractor 21, a multiplier 22, a subtractor 23, a first control block 24, a first control unit 25, a second control unit 26, a second control block 27, and a third control block 28. The first control block 24 has a multiplier 24a, a comparator 24b, an open/close contact 24c, an inverter 24e, and an open/close contact 24f. The second control block 27 has an adder 27a and a subtractor 27b. The third control block 28 has a comparator 28a, a comparator 28b, an inverter 28c, and an inverter 28d. It is noted that: the subtractor 21 and the first control unit 25 correspond to a first operation section of the present invention; the multiplier 22, the subtractor 23, the first control block 24, and the second control unit 26 correspond to a second operation section of the present invention; and the second control block 27 and the third control block 28 correspond to a switching control section of the present invention. In addition, the comparator 24b corresponds to a reactor current direction detection section of the present invention.

An output voltage target value Vout* as an instruction value for the high-voltage-side voltage, and the output voltage Vout as a detection value of the high-voltage-side voltage detected by the voltage sensor 103 are inputted to the subtractor 21, and a difference voltage ΔVout which is the difference therebetween is inputted to the first control unit 25. In addition, the output voltage Vout is multiplied by 0.5 by the multiplier 22 having a multiplication constant set at 0.5, and the resultant value is outputted, as a charge-discharge capacitor voltage target value Vcf* which is a voltage instruction value for the charge-discharge capacitor, to the subtractor 23. The charge-discharge capacitor voltage Vcf as a voltage detection value of the charge-discharge capacitor detected by the voltage sensor 104 is inputted to the subtractor 23, whereby a difference voltage ΔVcf between the charge-discharge capacitor voltage target value Vcf* and the charge-discharge capacitor voltage Vcf is calculated, and then outputted to the first control block 24. As described later in detail, the second control unit 26 amplifies the difference voltage ΔVcf between the charge-discharge capacitor voltage target value Vcf* and the charge-discharge capacitor voltage Vcf. It is noted that in the present embodiment, in order to minimize the ripple current in the reactor, the charge-discharge capacitor voltage target value Vcf* is set to be a half value (0.5 time) of the output voltage Vout, as described above.

In the first control block 24, the reactor current IL detected by the current sensor 105 is inputted to the comparator 24b, and the open/close contacts 24c and 24f are opened or closed in accordance with the polarity of the reactor current IL, whereby the polarity of the difference voltage ΔVcf between the charge-discharge capacitor voltage target value Vcf* and the charge-discharge capacitor voltage Vcf is switched. If the reactor current IL is positive, the difference voltage ΔVcf is directly outputted, and if the reactor current IL is negative, the difference voltage ΔVcf is multiplied by −1 by the multiplier 24a to invert the polarity thereof, and then outputted to the second control unit 26 by the open/close contact 24f being closed via the inverter 24e. The second control block 27 receives the output of the first control unit 25 as a first operation value, and the output of the second control unit 26 as a second operation value. Then, the adder 27a sums those outputs, and the resultant value is outputted, as an ON duty D1 which is the conduction ratio of the switching device S1, to the third control block 28. In addition, the subtractor 27b calculates the difference between the output of the first control unit 25 and the output of the second control unit 26, and the difference is outputted, as an ON duty D2 which is the conduction ratio of the switching device S2, to the third control block 28.

The third control block 28 is a block for generating a PWM signal. A gate signal G1 for the switching device S1 is generated by inputting the ON duty D1 and a first triangle wave SW1 to the comparator 28a and comparing them. A gate signal G2 for the switching device S2 is generated by inputting the ON duty D2 and a second triangle wave SW2 to the comparator 28b and comparing them. A signal inverted from the gate signal G2 by the inverter 28d is outputted as a gate signal G3 for the switching device S3. A signal inverted from the gate signal G1 by the inverter 28c is outputted as a gate signal G4 for the switching device S4. Here, in order to minimize the ripple current in the reactor 12, the phases of the first triangle wave SW1 and the second triangle wave SW2 are inverted by 180 degrees from each other.

Next, the operation of the DC/DC converter 100 in stationary state will be described. It is noted that the stationary state is the state in which the output voltage is stably obtained while ON/OFF control is performed for the switching devices S1 to S4. In addition, the DC/DC converter 100 has two operation states of: the state in which the electric motor 3 is driven by power being supplied from the battery 2 to the electric motor 3 (power running operation); and the state in which power generated by the electric motor 3 in electric generation state is supplied to the battery 2 (regenerative operation).

As shown in FIG. 3, in the stationary state, the DC/DC converter has four operation modes, i.e., modes 1 to 4. As shown in FIG. 3(a), in the mode 1, S1 and S3 are turned on and S2 and S4 are turned off, whereby energy is stored in the charge-discharge capacitor 101f in the power running operation, and energy in the charge-discharge capacitor 101f is released in the regenerative operation. As shown in FIG. 3(b), in the mode 2, S1 and S3 are turned off and S2 and S4 are turned on, whereby energy in the charge-discharge capacitor 101f is released in the power running operation, and energy is stored in the charge-discharge capacitor 101f in the regenerative operation. As shown in FIG. 3(c), in the mode 3, S1 and S2 are turned off and S3 and S4 are turned on, whereby energy in the reactor 12 is released in the power running operation, and energy is stored in the reactor 12 in the regenerative operation. As shown in FIG. 3(d), in the mode 4, S1 and S2 are turned on and S3 and S4 are turned off, whereby energy is stored in the reactor 12 in the power running operation, and energy in the reactor 12 is released in the regenerative operation. The time ratio among those modes is adjusted as appropriate, whereby the input voltage Vin as the low-voltage-side voltage inputted between the first terminal 100a and the second terminal 100b can be stepped up to any voltage to be outputted as the output voltage Vout between the third terminal 100c and the second terminal 100b.

Here, the operation of the DC/DC converter 100 in the stationary state differs between when a step-up ratio N of the output voltage Vout to the input voltage Vin is smaller than 2 and when the step-up ratio N is equal to or larger than 2.

First, operations in the power running state in the case where the step-up ratio N is smaller than 2 will be described.

Figure 4:
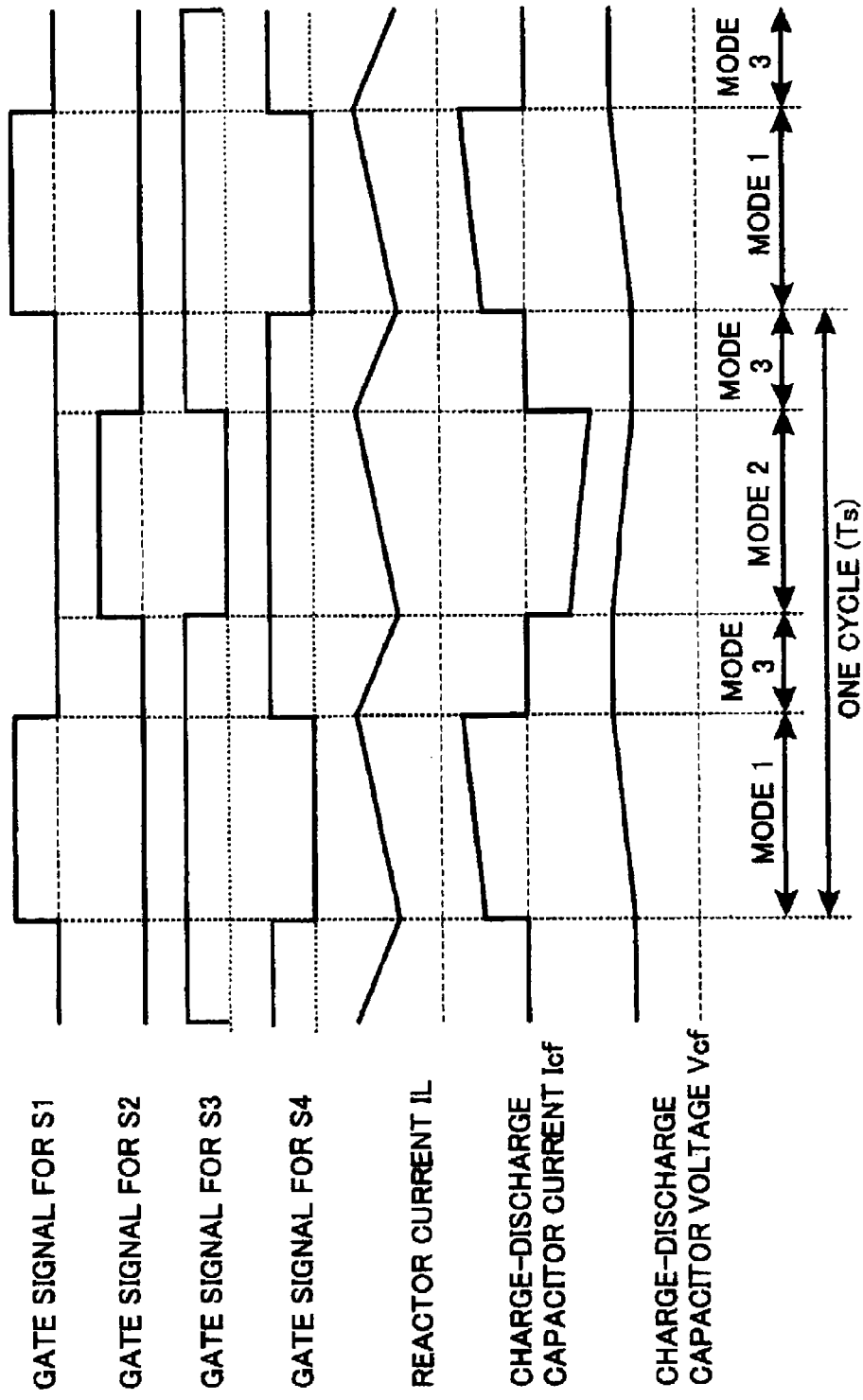
FIG. 4 is an operation explanation diagram of the DC/DC converter shown in FIG. 1.

FIG. 4 shows the gate signal voltage waveforms of the switching devices S1 to S4, the waveform of the reactor current IL, the waveform of a current Icf of the charge-discharge capacitor 101f, and the waveform of the charge-discharge capacitor voltage Vcf, in the case where the step-up ratio N is smaller than 2. In the stationary state, the charge-discharge capacitor voltage Vcf is controlled to be about a half of the output voltage Vout, and the magnitude relationship among the input voltage Vin, the output voltage Vout, and the charge-discharge capacitor voltage Vcf is as follows.

Vout>Vin>Vcf

When the gate signals for the switching devices S1 and S3 are High and the gate signals for the switching devices S2 and S4 are Low (mode 1 (FIG. 3(a))), since the switching devices S1 and S3 are ON and the switching devices S2 and S4 are OFF, energy transfers from the low-voltage-side smoothing capacitor 11 to the reactor 12 and the charge-discharge capacitor 101f through the following route.

Low-voltage-side smoothing capacitor 11 (Ci)→reactor 12 (L)→switching device S3→charge-discharge capacitor 101f (Cf)→switching device S1

Next, when the gate signals for the switching devices S1 and S2 are Low and the gate signals for the switching devices S3 and S4 are High (mode 3 (FIG. 3(c))), since the switching devices S1 and S2 are OFF and the switching devices S3 and S4 are ON, energy stored in the reactor 12 transfers to the low-voltage-side smoothing capacitor 11 and the high-voltage-side smoothing capacitor 108 through the following route.

Low-voltage-side smoothing capacitor 11 (Ci)→reactor 12 (L)→switching device S3→switching device S4→high-voltage-side smoothing capacitor 108 (Co)

Next, when the gate signals for the switching devices S1 and S3 are Low and the gate signals for the switching devices S2 and S4 are High (mode 2 (FIG. 3(b))), since the switching devices S1 and S3 are OFF and the switching devices S2 and S4 are ON, energy stored in the charge-discharge capacitor 101f transfers to the low-voltage-side smoothing capacitor 11 and the high-voltage-side smoothing capacitor 108 while energy is stored in the reactor 12, through the following route.

Low-voltage-side smoothing capacitor 11 (Ci)→reactor 12 (L)→switching device S2→charge-discharge capacitor 101f (Cf)→switching device S4→high-voltage-side smoothing capacitor 108 (Co)

Next, when the gate signals for the switching devices S1 and S2 are Low and the gate signals for the switching devices S3 and S4 are High (mode 3), since the switching devices S1 and S2 are OFF and the switching devices S3 and S4 are ON, energy stored in the reactor 12 transfers to the low-voltage-side smoothing capacitor 11 and the high-voltage-side smoothing capacitor 108 through the following route.

Low-voltage-side smoothing capacitor 11 (Ci)→reactor 12 (L)→switching device S3→switching device S4→high-voltage-side smoothing capacitor 108 (Co)

The above series of operations of "mode 1, mode 3, mode 2, and then mode 3" is repeated, whereby the input voltage Vin inputted between the first terminal 100a and the second terminal 100b is stepped up to any voltage that is one to less than two times of the input voltage Vin, and the stepped-up voltage is outputted as the output voltage Vout between the third terminal 100c and the second terminal 100b, while energy of the battery 2 is supplied to the electric motor 3.

Next, operations in the power running operation in the case where the step-up ratio N is equal to or larger than 2 will be described.

Figure 5:
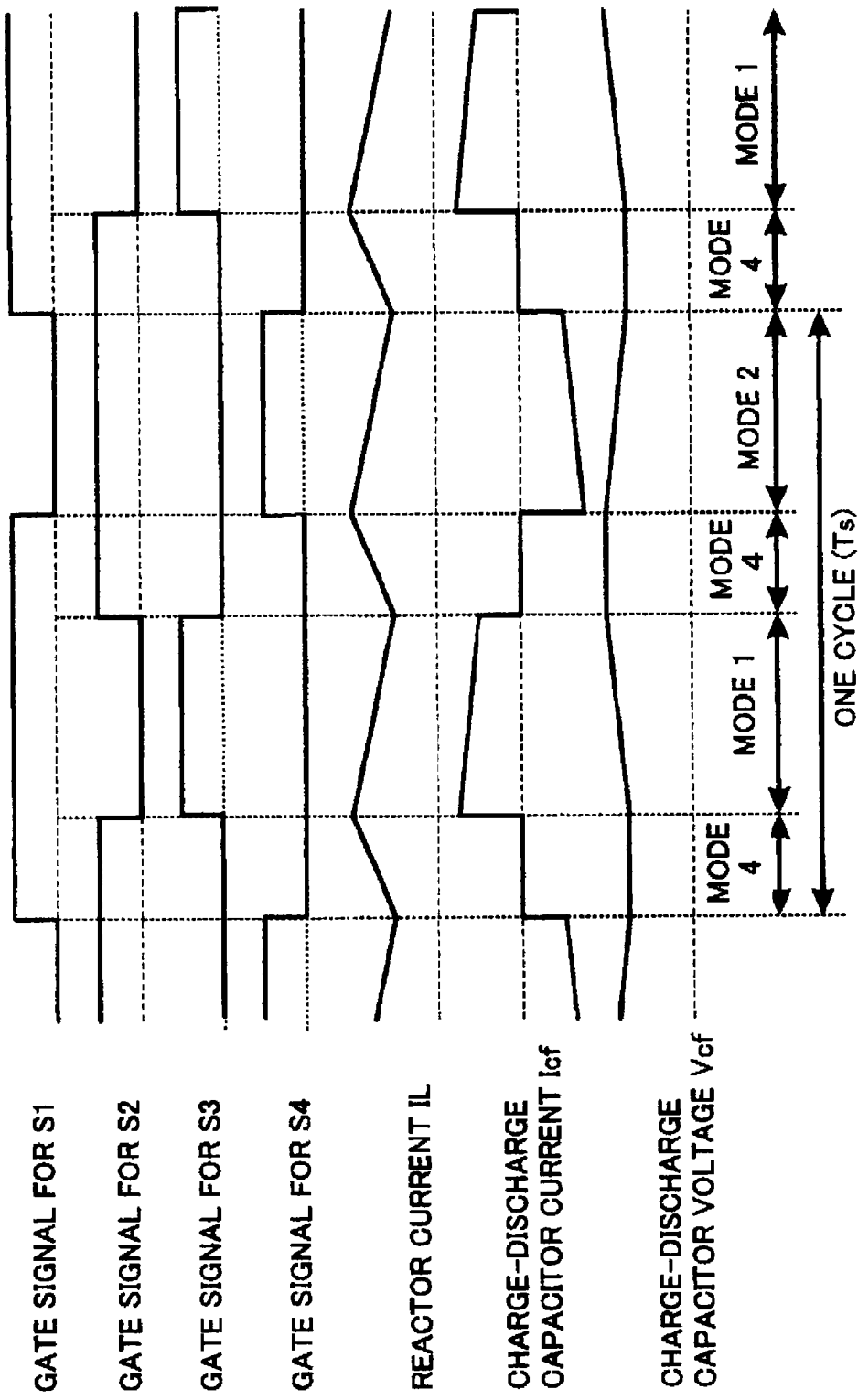
FIG. 5 is an operation explanation diagram of the DC/DC converter shown in FIG. 1.

FIG. 5 shows the gate signal voltage waveforms of the switching devices S1 and S2, the waveform of the reactor current IL, the waveform of the current Icf (charge-discharge capacitor current) of the charge-discharge capacitor 101f, and the waveform of the charge-discharge capacitor voltage Vcf, in the case where the step-up ratio N is equal to or larger than 2. In the stationary state, the charge-discharge capacitor voltage Vcf is controlled to be about a half of the output voltage Vout, and the magnitude relationship among the input voltage Vin, the output voltage Vout, and the charge-discharge capacitor voltage Vcf is as follows.

Vout>Vcf>Vin

When the gate signals for the switching devices S1 and S2 are High and the gate signals for the switching devices S3 and S4 are Low (mode 4 (FIG. 3(d))), since the switching devices S1 and S2 are ON and the switching devices S3 and S4 are OFF, energy transfers from the low-voltage-side smoothing capacitor 11 to the reactor 12 through the following route.

Low-voltage-side smoothing capacitor 11 (Ci)→reactor 12 (L)→switching device S2→switching device S1

Next, when the gate signals for the switching devices S1 and S3 are High and the gate signals for the switching devices S2 and S4 are Low (mode 1), since the switching devices S1 and S3 are ON and the switching devices S2 and S4 are OFF, energy stored in the reactor 12 transfers to the low-voltage-side smoothing capacitor 11 and the charge-discharge capacitor 101f through the following route.

Low-voltage-side smoothing capacitor 11 (Ci)→reactor 12 (L)→switching device S3→charge-discharge capacitor 101f (Cf)→switching device S1

Next, when the gate signals for the switching devices S1 and S2 are High and the gate signals for the switching devices S3 and S4 are Low (mode 4), since the switching devices S1 and S2 are ON and the switching devices S3 and S4 are OFF, energy transfers from the low-voltage-side smoothing capacitor 11 to the reactor 12 through the following route.

Low-voltage-side smoothing capacitor 11 (Ci)→reactor 12 (L)→switching device S2→switching device S1

Next, when the gate signals for the switching devices S1 and S3 are Low and the gate signals for the switching devices S2 and S4 are High (mode 2), since the switching devices S1 and S3 are OFF and the switching devices S2 and S4 are ON, energy stored in the reactor 12 and the charge-discharge capacitor 101f transfers to the low-voltage-side smoothing capacitor 11 and the high-voltage-side smoothing capacitor 108 through the following route.

Low-voltage-side smoothing capacitor 11 (Ci)→reactor 12 (L)→switching device S2→charge-discharge capacitor 101f (Cf)→switching device S4→high-voltage-side smoothing capacitor 108 (Co)

The above series of operations of "mode 4, mode 1, mode 4, and then mode 2" is repeated, whereby the input voltage Vin inputted between the first terminal 100a and the second terminal 100b is stepped up to any voltage that is equal to or higher than two times of the input voltage Vin, and the stepped-up voltage is outputted as the output voltage Vout between the third terminal 100c and the second terminal 100b, while energy of the battery 2 is supplied to the electric motor 3.

Next, operations in the regenerative state in the case where the step-up ratio N is smaller than 2 will be described.

FIG. 6 shows the gate signal voltage waveforms of the switching devices S1 to S4, the waveform of the reactor current IL, the waveform of the charge-discharge capacitor current Icf, and the waveform of the charge-discharge capacitor voltage Vcf, in the case where the step-up ratio N is smaller than 2. In the stationary state, the charge-discharge capacitor voltage Vcf is controlled to be about a half of the output voltage Vout, and the magnitude relationship among the input voltage Vin, the output voltage Vout, and the charge-discharge capacitor voltage Vcf is as follows.

Vout>Vin>Vcf

When the gate signals for the switching devices S1 and S3 are High and the gate signals for the switching devices S2 and S4 are Low (mode 1), since the switching devices S1 and S3 are ON and the switching devices S2 and S4 are OFF, energy transfers from the charge-discharge capacitor 101*f* and the reactor 12 to the low-voltage-side smoothing capacitor 11 through the following route.

Low-voltage-side smoothing capacitor 11 (Ci)←reactor 12 (L)←switching device S3←charge-discharge capacitor 101*f* (Cf)←switching device S1

Next, when the gate signals for the switching devices S1 and S2 are Low and the gate signals for the switching devices S3 and S4 are High (mode 3), since the switching devices S1 and S2 are OFF and the switching devices S3 and S4 are ON, energy transfers from the high-voltage-side smoothing capacitor 108 to the reactor 12 and the low-voltage-side smoothing capacitor 11 through the following route.

Low-voltage-side smoothing capacitor 11 (Ci)←reactor 12 (L)←switching device S3←switching device S4←high-voltage-side smoothing capacitor 108 (Co)

Next, when the gate signals for the switching devices S1 and S3 are Low and the gate signals for the switching devices S2 and S4 are High (mode 2), since the switching devices S1 and S3 are OFF and the switching devices S2 and S4 are ON, energy transfers from the high-voltage-side smoothing capacitor 108 and the reactor 12 to the charge-discharge capacitor 101*f* and the low-voltage-side smoothing capacitor 11 through the following route.

Low-voltage-side smoothing capacitor 11 (Ci)←reactor 12 (L)←switching device S2←charge-discharge capacitor 101*f* (Cf)←switching device S4←high-voltage-side smoothing capacitor 108 (Co)

Next, when the gate signals for the switching devices S1 and S2 are Low and the gate signals for the switching devices S3 and S4 are High (mode 3), since the switching devices S1 and S2 are OFF and the switching devices S3 and S4 are ON, energy transfers from the high-voltage-side smoothing capacitor 108 to the reactor 12 and the low-voltage-side smoothing capacitor 11 through the following route.

Low-voltage-side smoothing capacitor 11 (Ci)←reactor 12 (L)←switching device S3←switching device S4←high-voltage-side smoothing capacitor 108 (Co)

The above series of operations of "mode 1, mode 3, mode 2, and then mode 3" is repeated, whereby the input voltage Vin inputted between the first terminal 100*a* and the second terminal 100*b* is stepped up to any voltage that is one to less than two times of the input voltage yin, and the stepped-up voltage is outputted as the output voltage Vout between the third terminal 100*c* and the second terminal 100*b*, while energy generated by the electric motor 3 is stored in the battery 2.

Next, operations in the regenerative operation in the case where the step-up ratio N is equal to or larger than 2 will be described.

FIG. 7 shows the gate signal voltage waveforms of the switching devices S1 and S2, the waveform of the reactor current IL, the waveform of the charge-discharge capacitor current Icf, and the waveform of the charge-discharge capacitor voltage Vcf, in the regenerative operation in the case where the step-up ratio N is equal to or larger than 2. In the stationary state, the charge-discharge capacitor voltage Vcf is controlled to be about a half of the output voltage Vout, and the magnitude relationship among the input voltage Vin, the output voltage Vout, and the charge-discharge capacitor voltage Vcf is as follows.

$$Vout > Vcf > Vin$$

When the gate signals for the switching devices S1 and S2 are High and the gate signals for the switching devices S3 and S4 are Low (mode 4), since the switching devices S1 and S2 are ON and the switching devices S3 and S4 are OFF, energy transfers from the reactor 12 to the low-voltage-side smoothing capacitor 11 through the following route.

Low-voltage-side smoothing capacitor 11 (Ci)←reactor 12 (L)←switching device S2←switching device S1

Next, when the gate signals for the switching devices S1 and S3 are High and the gate signals for the switching devices S2 and S4 are Low (mode 1), since the switching devices S1 and S3 are ON and the switching devices S2 and S4 are OFF, energy transfers from the charge-discharge capacitor 101*f* to the reactor 12 and the low-voltage-side smoothing capacitor 11 through the following route.

Low-voltage-side smoothing capacitor 11 (Ci)←reactor 12 (L)←switching device S3←charge-discharge capacitor 101*f* (Cf)←switching device S1

Next, when the gate signals for the switching devices S1 and S2 are High and the gate signals for the switching devices S3 and S4 are Low (mode 4), since the switching devices S1 and S2 are ON and the switching devices S3 and S4 are OFF, energy transfers from the reactor 12 to the low-voltage-side smoothing capacitor 11 through the following route.

Low-voltage-side smoothing capacitor 11 (Ci)←reactor 12 (L)←switching device S2←switching device S1

Next, when the gate signals for the switching devices S1 and S3 are Low and the gate signals for the switching devices S2 and S4 are High (mode 2), since the switching devices S1 and S3 are OFF and the switching devices S2 and S4 are ON, energy transfers from the high-voltage-side smoothing capacitor 108 to the reactor 12, the charge-discharge capacitor 101*f*, and the low-voltage-side smoothing capacitor 11 through the following route.

Low-voltage-side smoothing capacitor 11 (Ci)←reactor 12 (L)←switching device S2←charge-discharge capacitor 101*f* (Cf)←switching device S4←high-voltage-side smoothing capacitor 108 (Co)

The above series of operations of "mode 4, mode 1, mode 4, and then mode 2" is repeated, whereby the input voltage Vin inputted between the first terminal 100*a* and the second terminal 100*b* is stepped up to any voltage that is equal to or higher than two times of the input voltage Vin, and the stepped-up voltage is outputted as the output voltage Vout between the third terminal 100*c* and the second terminal 100*b*, while energy generated by the electric motor 3 is stored in the battery 2.

Next, the operation of the control apparatus of the DC/DC converter 100 of the present embodiment 1 will be described. If the ON duty of the switching device S1 is D1 and the ON duty of the switching device S2 is D2, the ON duty of the switching device S3 is (1−D2) and the ON duty of the switching device S4 is (1−D1). If the capacitance of the low-voltage-side smoothing capacitor 11 is Ci; the capacitance of the high-voltage-side smoothing capacitor 108 on the output side is Co; the capacitance of the charge-discharge capacitor 101*f* is Cf; the inductance value of the reactor 12 for storing energy is L; a current flowing in the reactor is IL; and the output current is Io, the average equation of state of the DC/DC converter 100 is represented by expression (1).

[Expression 1]

$$\frac{d}{dt}\begin{bmatrix} IL \\ Vout \\ Vcf \end{bmatrix} = \begin{bmatrix} 0 & -\frac{1-D1}{L} & \frac{D1-D2}{L} \\ \frac{1-D1}{Co} & 0 & 0 \\ \frac{D1-D2}{Cf} & 0 & 0 \end{bmatrix} \begin{bmatrix} IL \\ Vout \\ Vcf \end{bmatrix} + \begin{bmatrix} \frac{1}{L} \\ 0 \\ 0 \end{bmatrix} Vin + \begin{bmatrix} 0 \\ -\frac{1}{Co} \\ 0 \end{bmatrix} Ic \quad (1)$$

In the stationary state, if the left side of the expression (1) is assumed to be zero, expressions (2) to (4) are obtained, and it is found that in the stationary state, if the ON duty D1 and the ON duty D2 are set to be equal to each other, ideally, the output voltage Vout and the charge-discharge capacitor voltage Vcf each converge to a constant value.

$$Vout/Vin = 1/(1-D1) \quad (2)$$

$$IL = Io/(1-D1) \quad (3)$$

$$D1 = D2 \quad (4)$$

However, in an actual DC/DC converter, there is deviation from ideal state, such as loss due to a resistance component of the circuit and ON duty error due to variation in signal delay of the gate signals. Particularly, the difference between the ON duty D1 of the switching device S1 and the ON duty D2 of the switching device S2 has a large influence on the charge-discharge capacitor voltage Vcf. If the ON duty D1 is larger than the ON duty D2, from expression (1), the charge-discharge capacitor voltage Vcf gradually increases to finally become equal to the output voltage Vout. On the other hand, if the ON duty D1 is smaller than the ON duty D2, from expression (1), the charge-discharge capacitor voltage Vcf gradually decreases to finally become zero.

If the charge-discharge capacitor voltage Vcf has decreased to be zero, when the switching device S1 is ON and the switching device S4 is OFF, the output voltage Vout is applied only to the switching device S4, and when the switching device S1 is OFF and the switching device S4 is ON, the output voltage Vout is applied only to the switching device S1. On the other hand, if the charge-discharge capacitor voltage Vcf has increased to be equal to the output voltage Vout, the output voltage Vout is applied to one of the switching device S2 and the switching device S3. In order to prevent overvoltage breakdown of the switching devices, the breakdown voltage of the switching devices needs to be equal to or higher than the output voltage Vout, and as a result, the cost unnecessarily increases and the efficiency reduces.

In the present embodiment, the first control unit 25 which performs feedback control for causing the output voltage Vout to be the output voltage target value Vout*, and the second control unit 26 which performs feedback control for causing the charge-discharge capacitor voltage Vcf to be the target voltage (target charge-discharge capacitor voltage) Vcf* of the charge-discharge capacitor 101f, are provided; an addition value and a subtraction value are obtained by addition and subtraction between the output values of the first and second control units 25 and 26; and the addition value and the subtraction value are used for ON duty instructions for the switching devices S1 to S4. Therefore, it becomes possible to control the output voltage Vout and the charge-discharge capacitor voltage Vcf so as to be desired values.

Hereinafter, the detailed operation of the control apparatus 109 will be described. If the output voltage Vout is higher than the output voltage target value Vout*, in order to decrease the output voltage Vout, the first operation value that decreases both ON duties of the switching devices S1 and S2 is outputted by the first control unit 25. On the other hand, if the output voltage Vout is lower than the output voltage target value Vout*, in order to increase the output voltage Vout, the first operation value that increases both ON duties of the switching devices S1 and S2 is outputted by the first control unit 25.

In the case where the charge-discharge capacitor voltage Vcf is controlled to be the target charge-discharge capacitor voltage Vcf*, as shown in expression (1), the convergence condition differs between the power running operation (the reactor current IL is positive) and the regenerative operation (the reactor current IL is negative).

If the reactor current IL is positive (power running operation), and the charge-discharge capacitor voltage Vcf is higher than the target charge-discharge capacitor voltage Vcf*, in order to decrease the charge-discharge capacitor voltage Vcf, the second operation value that decreases the ON duty D1 of the switching device S1 and increases the ON duty D2 of the switching device S2 is outputted by the second control unit 26. If the reactor current IL is positive (power running operation), and the charge-discharge capacitor voltage Vcf is lower than the target charge-discharge capacitor voltage Vcf*, in order to increase the charge-discharge capacitor voltage Vcf, the second operation value that increases the ON duty D1 of the switching device S1 and decreases the ON duty D2 of the switching device S2 is outputted by the second control unit 26.

If the reactor current IL is negative (regenerative operation), and the charge-discharge capacitor voltage Vcf is higher than the target charge-discharge capacitor voltage Vcf*, in order to decrease the charge-discharge capacitor voltage Vcf, the second operation value that increases the ON duty D1 of the switching device S1 and decreases the ON duty D2 of the switching device S2 is outputted by the second control unit 26. If the reactor current IL is negative (regenerative operation), and the charge-discharge capacitor voltage Vcf is lower than the target charge-discharge capacitor voltage Vcf*, in order to increase the charge-discharge capacitor voltage Vcf, the second operation value that decreases the ON duty D1 of the switching device S1 and increases the ON duty D2 of the switching device S2 is outputted by the second control unit 26.

By the above control, whether in the power running operation or in the regenerative operation, it becomes possible to control the output voltage Vout so as to be the output voltage target value Vout*, and to control the charge-discharge capacitor voltage Vcf so as to be the target charge-discharge capacitor voltage Vcf*. In addition, since the current sensor 105 only needs to have function of determining the polarity of a current flowing in the reactor 12, an inexpensive current sensor can be used. Therefore, it becomes possible to configure the control apparatus of the DC/DC converter with low cost.

FIG. 8 shows a modification of the control apparatus. In FIG. 8, a control apparatus 119 has a fourth control block 34. The fourth control block 34 has a gain selector 34a and a current determination unit 34b. It is noted that the multiplier 22, the subtractor 23, the fourth control block 34, and the second control unit 26 correspond to the second operation section of the present invention. In addition, the current determination unit 34b corresponds to a reactor current determination section of the present invention. In the control apparatus 109 shown in FIG. 2, the polarity of the difference voltage ΔVcf between the charge-discharge capacitor voltage target value Vcf* and the charge-discharge capacitor voltage Vcf is switched by the first control block 24 in accordance with the polarity of the reactor current IL, and then the difference voltage ΔVcf is outputted to the second control unit 26. On the other hand, in FIG. 8, a plurality of control gains are set in advance for the gain selector 34a; the current determination unit 34b determines the magnitude of the reactor current IL of the reactor; the gain selector 34a selects a control gain in accordance with the magnitude of the reactor current IL of the reactor; the difference voltage ΔVcf multiplied by the selected gain is outputted to the second control unit 26; and the second control unit 26 outputs the second operation value changed in accordance with the magnitude of the reactor current IL. Since the other components are the same as those of the control apparatus 109 shown in FIG. 3, they are respectively denoted by the same reference numerals and characters, and the description thereof is omitted. By the above configuration, the change amount of the control gain due to change in the reactor current can be reduced, and therefore, it becomes possible to improve the control stability of the DC/DC converter.

FIG. 9 shows another modification of the control apparatus. In a control apparatus 129 shown in FIG. 9, the arrangement order of the second control unit 26 and the first control block 24 is changed. The difference voltage ΔVcf between the charge-discharge capacitor voltage target value Vcf* and the charge-discharge capacitor voltage Vcf is inputted from the subtractor 23 to the second control unit 26 which amplifies the difference voltage ΔVcf, and then the amplified difference voltage ΔVcf is inputted to the first control block 24. In the first control block 24, similarly to the first control block 24 shown in FIG. 2, the polarity of the output of the second control unit 26 is switched in accordance with the polarity of the reactor current IL, and then the resultant value is outputted as the second operation value. Since the other components are the same as those of embodiment 1 shown in FIG. 2, they are respectively denoted by the same reference numerals and characters, and the description thereof is omitted. By the above configuration, influence by response delay of the second control unit 26 can be substantially ignored. Therefore, even in the case where the power running operation and the regenerative operation are frequently switched, the charge-discharge capacitor voltage Vcf can be controlled at high speed.

FIG. 10 shows still another modification of the control apparatus. In FIG. 10, a control apparatus 139 has a fifth control block 44. The fifth control block 44 has a divider 44a and a limiter 44b, as a second operation value adjustment section. It is noted that the multiplier 22, the subtractor 23, the fifth control block 44, and the second control unit 26 correspond to the second operation section of the present invention. In the divider 44a, the difference voltage ΔVcf between the charge-discharge capacitor voltage target value Vcf* and the charge-discharge capacitor voltage Vcf, outputted from the subtractor 23, is divided by the reactor current IL inputted via the limiter 44b, and the divided value is inputted to the second control unit 26. In this case, in order to prevent the denominator of the division in the divider 44a from being zero, the reactor current IL is inputted to the divider 44a via the limiter 44b. By the above configuration, owing to the division in the divider 44a, the input to the second control unit 26 is changed in accordance with the magnitude of the reactor current IL, so that the second operation value outputted from the second control unit 26 is also adjusted in accordance with the magnitude of the reactor current IL. As a result, since the control responsiveness of the charge-discharge capacitor 101f becomes constant regardless of the magnitude of the reactor current IL, it becomes possible to control the charge-discharge capacitor voltage Vcf at high speed even in the case where the output power of the DC/DC converter 100 is small.

In the above control apparatuses 109, 119, 129 etc., the second control block 27 uses, for the ON duty D1 of the switching device S1, the addition value obtained by the adder 27a summing the output of the first control unit 25 and the output of the second control unit 26, and uses, for the ON duty D2 of the switching device S2, the subtraction value obtained by the subtractor 27b subtracting the output of the second control unit 26 from the output of the first control unit 25. However, while the addition value obtained by summing the output of the first control unit 25 and the output of the second control unit 26 is used for the ON duty D1 of the switching device S1, the output value of the first control unit 25 may be directly used for the ON duty D2 of the switching device S2. Similarly, the output value of the first control unit 25 may be directly used for the ON duty D1 of the switching device S1, while the subtraction value obtained by subtracting the output of the second control unit 26 from the output of the first control unit 25 is used for the ON duty D2 of the switching device S2.

In the second control block 27, if one of the ON duties D1 and D2 is negative, the value obtained by subtracting the ON duty D2 from the ON duty D1 may be kept constant and the negative one of the ON duties may be fixed at zero. For example, in the case where the output value of the first control unit 25 is 0.1 and the output value of the second control unit 26 is 0.2, the ON duty D1 is positive as the addition value is 0.3, and the ON duty D2 is negative as the subtraction value is −0.1. Therefore, the ON duty D2 is set at zero and the ON duty D1 is corrected to be 0.4, so that the value of difference (D1−D2) between the ON duties is kept constant. Thus, since the control responsiveness of the voltage of the charge-discharge capacitor 101f can be kept constant, it becomes possible to control the charge-discharge capacitor voltage Vcf at high speed even in the case where the output power or the step-up ratio is small.

Instead of using a current sensor for the reactor current IL flowing in the reactor 12, the reactor current may be estimated from the switching-relevant inter-terminal voltage of the switching device, as in a voltage sensor 106 of a DC/DC converter shown in FIG. 11. In FIG. 11, a control apparatus 209 of a DC/DC converter 200 detects a collector-emitter voltage Vce1 of the switching device S1 as the switching-relevant inter-terminal voltage, by using the voltage sensor 106. When the gate signal G1 for the switching device S1 is High, if the collector-emitter voltage Vce1 is positive, the reactor current IL is positive, and if the collector-emitter voltage Vce1 is negative, the reactor current IL is negative. By the above configuration, it becomes possible to control the charge-discharge capacitor voltage Vcf in the power running operation and the regenerative operation so as to be a desired value, without using an expensive current sensor.

The reactor current IL flowing in the reactor 12 may be estimated from the change amount of the charge-discharge capacitor voltage Vcf. As shown in FIGS. 4 to 7, the charge-discharge capacitor voltage Vcf in the period of mode 1 increases in the power running operation and decreases in the regenerative operation. Similarly, the charge-discharge capacitor voltage Vcf in the period of mode 2 decreases in the power running operation and increases in the regenerative operation. Thus, if the charge-discharge capacitor voltage Vcf in the period of mode 1 increases, it can be estimated that the reactor current IL is positive in the power running operation, and on the other hand, if the voltage Vcf decreases, it can be estimated that the reactor current IL is negative in the regenerative operation. By the above configuration, it becomes possible to control the charge-discharge capacitor voltage Vcf in the power running operation and the regenerative operation so as to be a desired value, without using an expensive current sensor.

For example, in the above control apparatuses 109, 119 etc., the output voltage target value Vout* as an instruction value for the high-voltage-side voltage, and the output voltage Vout as a detection value of the high-voltage-side voltage detected by the voltage sensor 103 are inputted to the subtractor 21 and the first control unit 25, whereby the first operation value is calculated. However, an input voltage target value Vin* as an instruction value for the low-voltage-side voltage, and the input voltage Vin of the low-voltage-side smoothing capacitor 11 as a detection value of the low-voltage-side voltage may be inputted, whereby the first operation value may be calculated. It is noted that, as described above, by controlling switching of the switching devices S3 and S4 in accordance with the switching of the switching devices S1 and S2, the switching devices S3 and S4 are caused to have function as diode device (unidirectional conduction device), and by controlling switching of the switching devices S1 and S2 in accordance with the switching of the switching devices S3 and S4, the switching devices S1 and S2 are caused to have function as diode device (unidirectional conduction device).

As described above, according to the present embodiment, even in the case where various error factors occur or in the case where the power running operation and the regenerative operation are switched, the output voltage Vout and the charge-discharge capacitor voltage Vcf of the DC/DC converter can be always kept at desired constant values, and therefore, the risk of device breakdown can be absolutely avoided even if devices with low breakdown voltage are used for the switching devices S1 to S4 or the like of the DC voltage conversion section 101. Thus, a DC/DC converter with low cost and high efficiency can be obtained.

Embodiment 2

Figure 12:
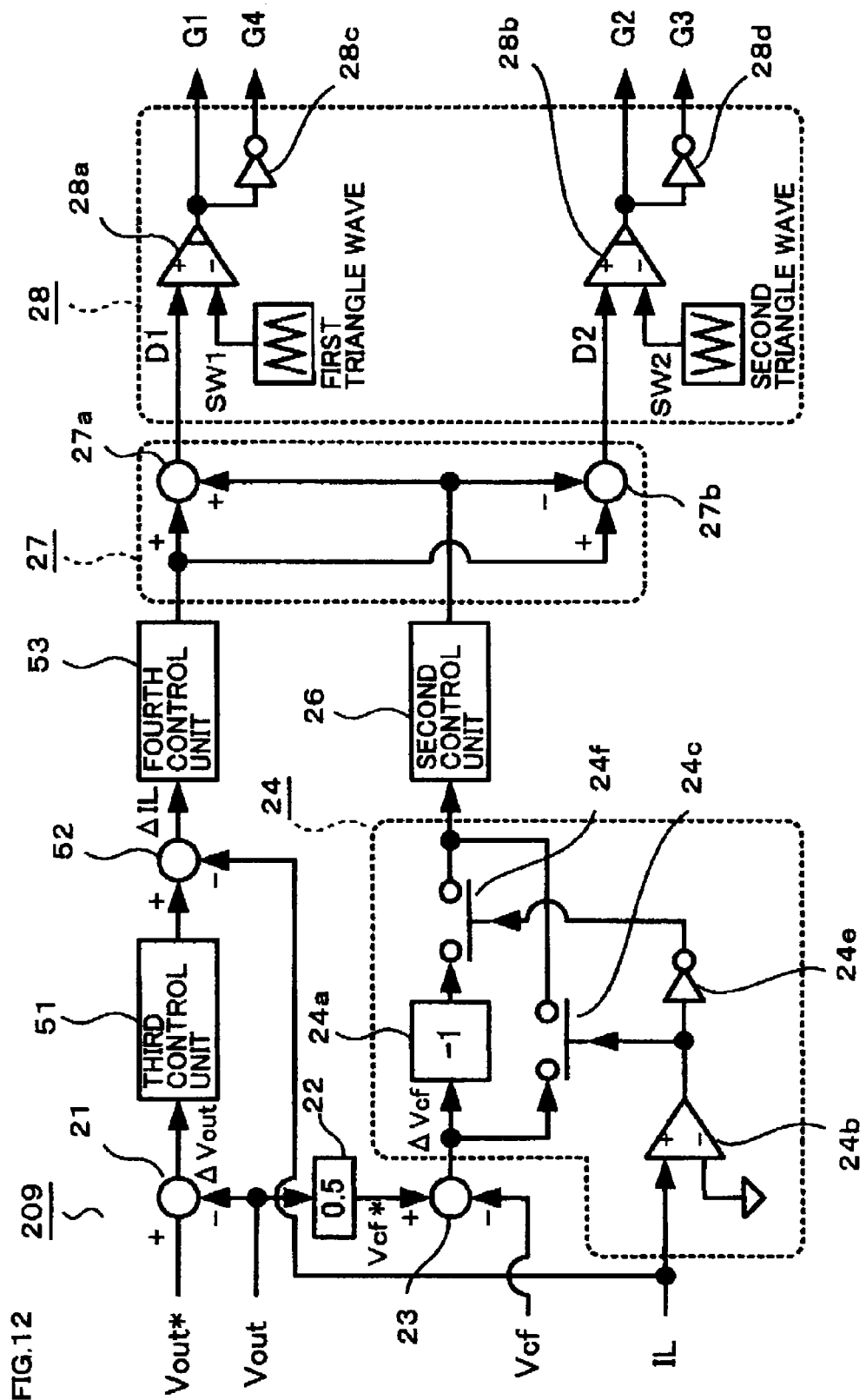
FIG. 12 is a circuit diagram showing the configuration of a control apparatus according to embodiment 2 of the present invention.
Figure 13:
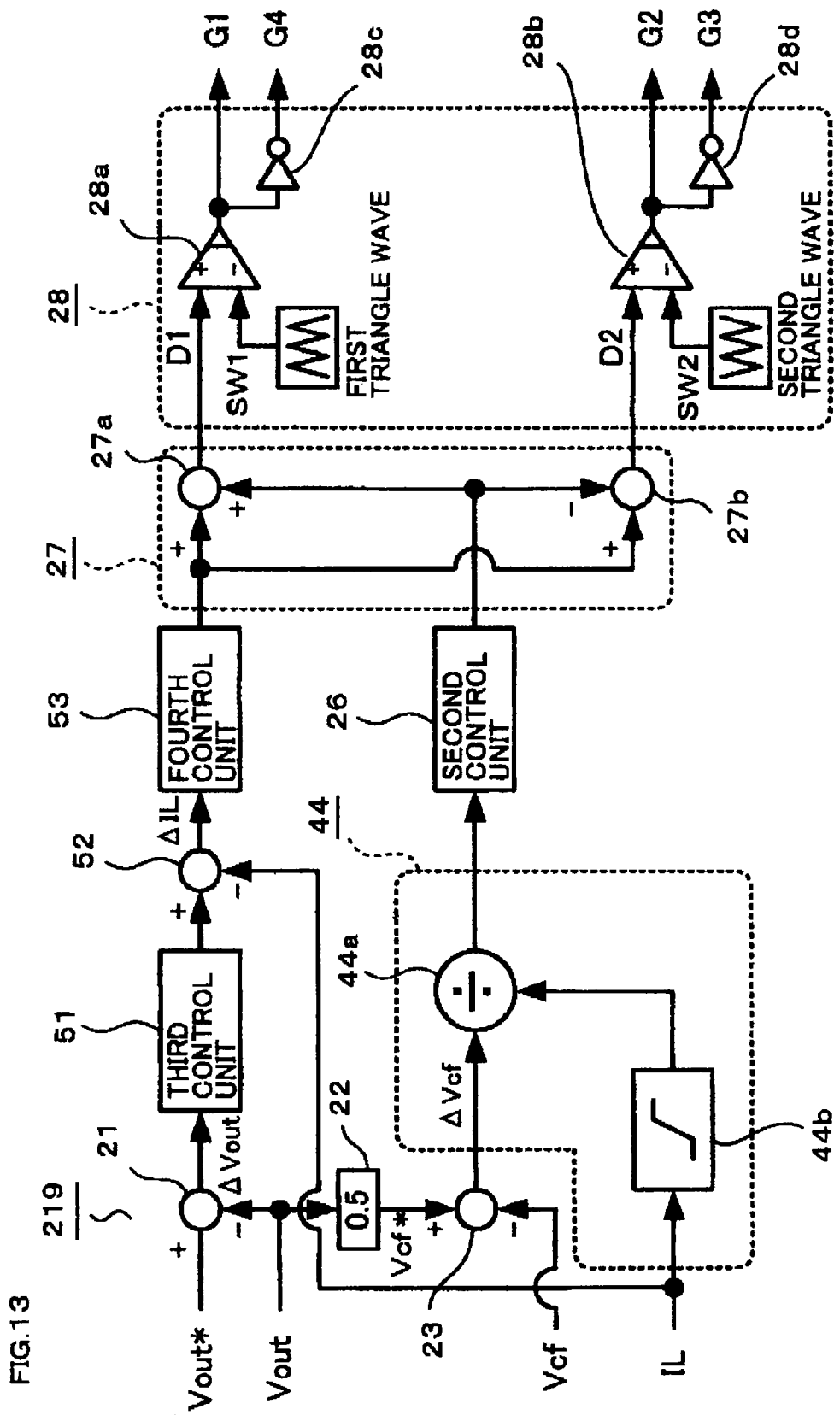
FIG. 13 is a circuit diagram showing the configuration of another control apparatus according to embodiment 2 of the present invention.

FIGS. 12 and 13 show embodiment 2. FIG. 12 is a circuit diagram showing the configuration of a control apparatus, and FIG. 13 is a circuit diagram showing the configuration of another control apparatus. In the present embodiment, the control apparatus 109 of the DC/DC converter 100 shown in FIG. 1 is replaced with a control apparatus 209 described below. In FIG. 12, the control apparatus 209 has a third control unit 51, a subtractor 52, and a fourth control unit 53. The third control unit 51 amplifies the difference voltage ΔVout between the output voltage target value Vout* and the output voltage Vout, and outputs a current target value IL* of the reactor 12, to perform feedback control for the output voltage. The subtractor 52 outputs a difference current ΔIL between the current target value IL* and the reactor current IL of the reactor 12. The fourth control unit 53 amplifies the difference current ΔIL outputted from the subtractor 52, and performs feedback control for current. Since the other components are the same as those of embodiment 1 shown in FIG. 2, they are respectively denoted by the same reference numerals and characters, and the description thereof is omitted. It is noted that the subtractor 21, the third control unit 51, the subtractor 52, and the fourth control unit 53 correspond to the first operation section of the present invention.

Next, the detailed operation of the control apparatus 209 will be described. If the output voltage Vout is higher than the output voltage target value Vout*, in order to decrease the output voltage Vout, the third control unit 51 decreases the current target value IL*. In order to decrease the current target value IL*, the fourth control unit 53 outputs the first operation value that decreases both ON duties of the switching devices S1 and S2. On the other hand, if the output voltage Vout is lower than the output voltage target value Vout*, in order to increase the output voltage Vout, the third control unit 51 increases the current target value IL*. In order to increase the current target value IL*, the fourth control unit 53 outputs the first operation value that increases both ON duties of the switching devices S1 and S2.

The second control block 27 determines the ON duties of the switching devices S1 to S4 in accordance with the output of the fourth control unit 53 and the output of the second control unit 26, that is, outputs, as the ON duty D1 of the switching device S1, an addition value between the output of the fourth control unit 53 and the output of the second control unit 26, and outputs, as the ON duty D2 of the switching device S2, a subtraction value between the output of the fourth control unit 53 and the output of the second control unit 26. Since the operations of the second control unit 26, the first control block 24, the third control block 28, and the like are the same as those of embodiment 1 shown in FIG. 2, the description thereof is omitted.

By the above control, whether in the power running operation or in the regenerative operation, it becomes possible to control the output voltage Vout so as to be the output voltage target value Vout*, and to control the charge-discharge capacitor voltage Vcf so as to be the target charge-discharge capacitor voltage Vcf*. In addition, by providing a current minor loop by the fourth control unit 53 on the inner side relative to the third control unit 51, it becomes possible to improve the control stability and the control responsiveness of the DC/DC converter. In addition, by setting the upper and lower limit values for the current target value IL* of the reactor which is the output of the third control unit 51, the reactor current IL can be limited. Therefore, excessively large current can be prevented from flowing in the DC/DC converter when load on the electric motor abruptly changes, and it becomes possible to configure a DC/DC converter with high reliability.

As shown in FIG. 13, in a control apparatus 219, the divider 44a of the fifth control block 44 may divide, by the reactor current IL, the difference voltage ΔVcf between the charge-discharge capacitor voltage target value Vcf* and the charge-discharge capacitor voltage Vcf, and the divided value may be inputted to the second control unit 26, whereby the second operation value changed in accordance with the magnitude of the reactor current IL may be outputted. It is noted that instead of the fifth control block 44, the first control block 24 shown in FIG. 2 may be used. It is noted that the multiplier 22, the subtractor 23, the fifth control block 44, and the second control unit 26 correspond to the second operation section of the present invention.

As described above, according to the present embodiment, even in the case where various error factors occur or in the case where the power running operation and the regenerative operation are switched, the output voltage Vout (see FIG. 1) and the charge-discharge capacitor voltage Vcf (see FIG. 1) can be always kept at a desired value, and therefore, the risk of device breakdown can be absolutely avoided even if devices with low breakdown voltage are used for the switching devices S1 to S4 (see FIG. 1) or diodes connected in antiparallel thereto in the DC voltage conversion section 101. Thus, a DC/DC converter with low cost and high efficiency can be obtained.

Embodiment 3

Figure 14:
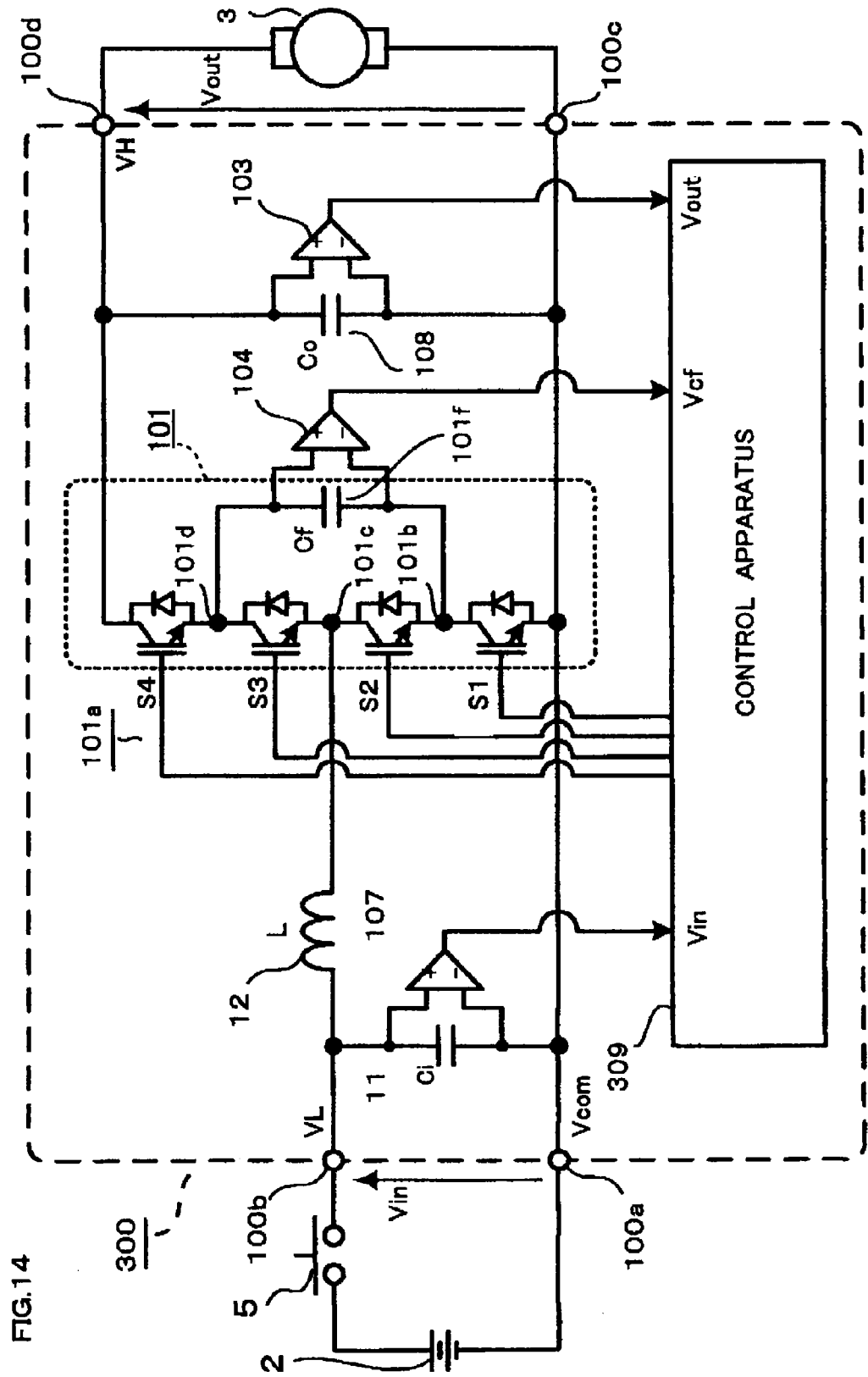
FIG. 14 is a configuration diagram showing the configuration of a DC/DC converter according to embodiment 3 of the present invention.
Figure 15:
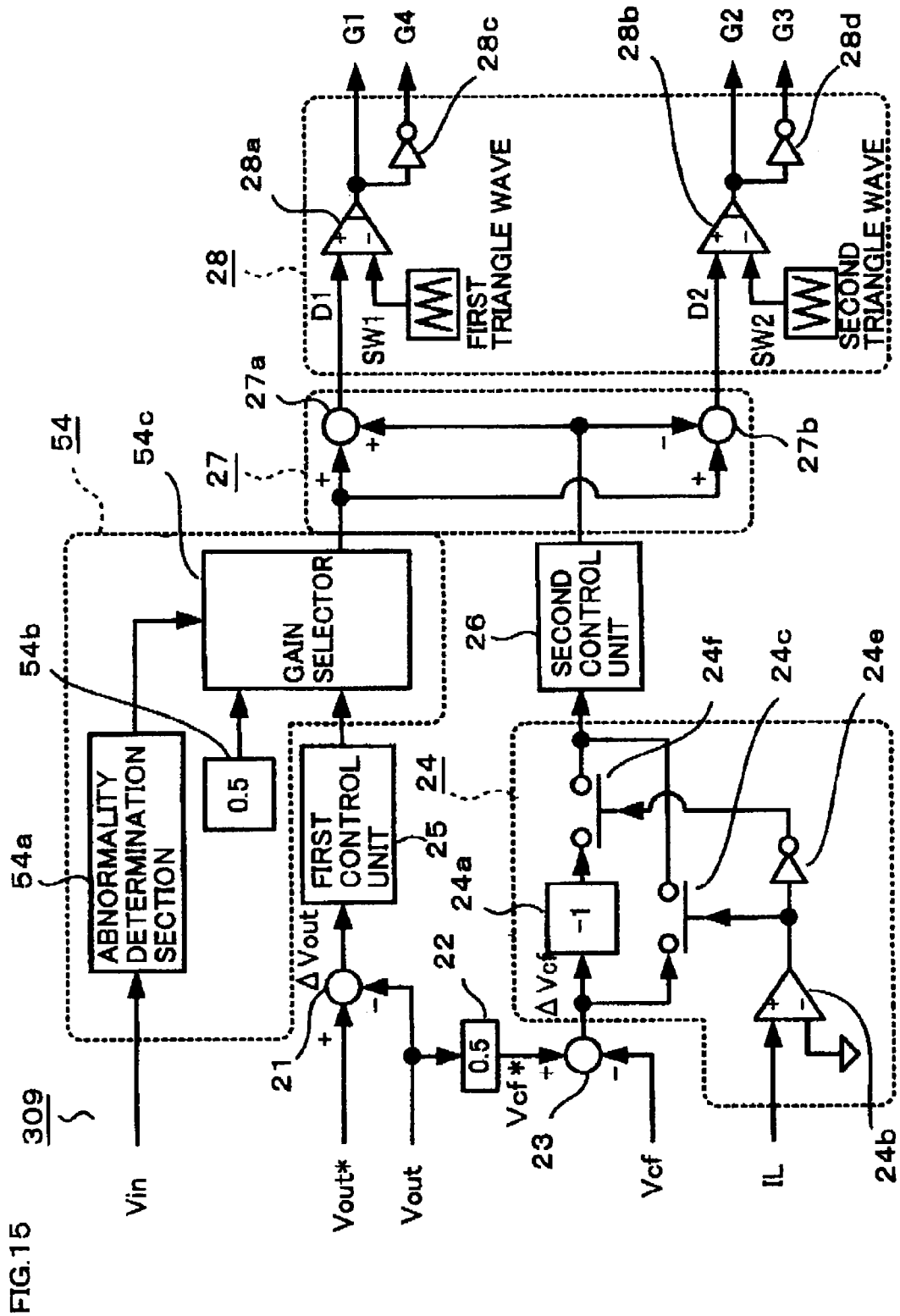
FIG. 15 is a circuit diagram showing the configuration of a control apparatus shown in FIG. 14.
Figure 16:
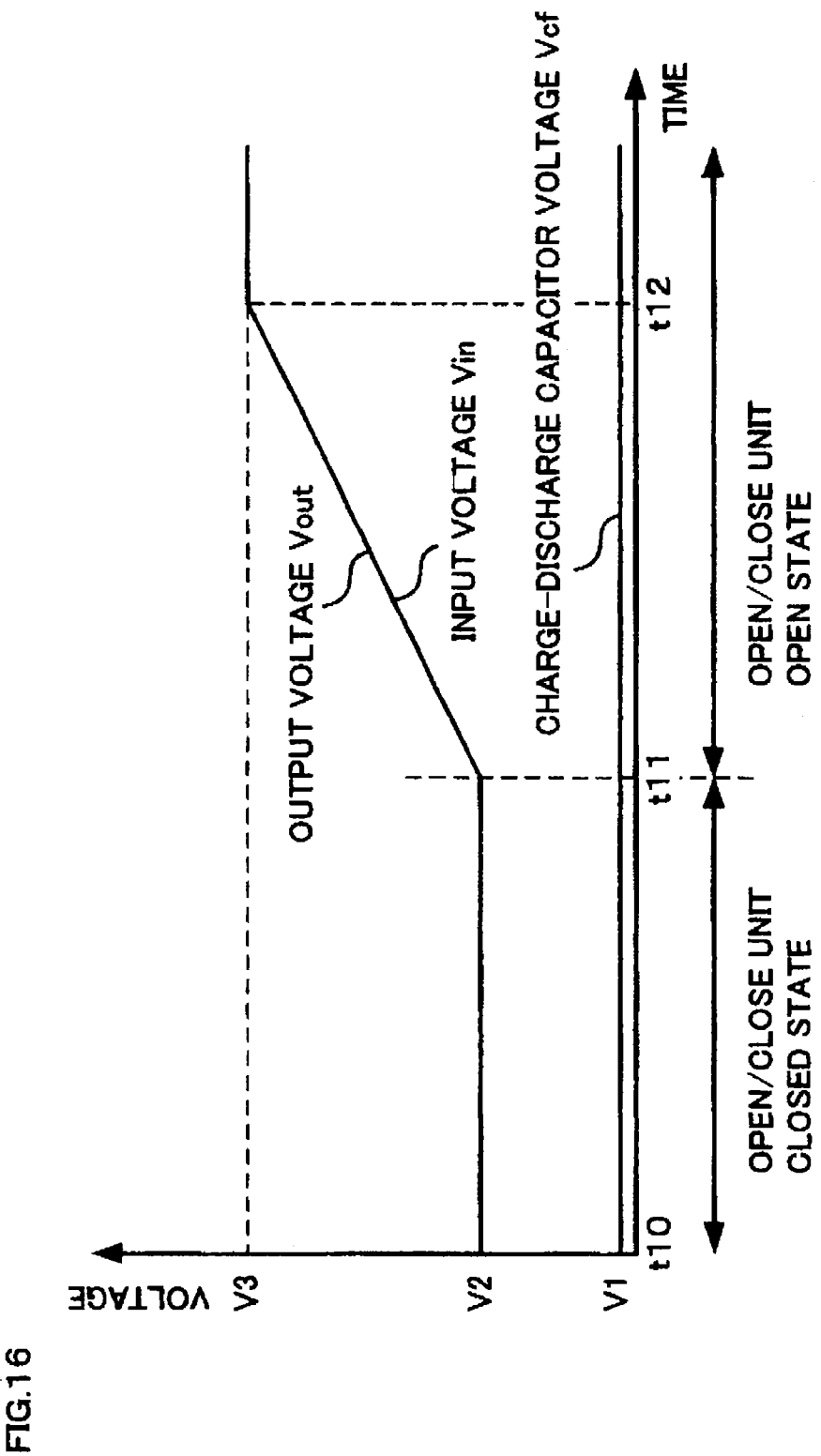
FIG. 16 is an operation explanation diagram of the control apparatus shown in FIG. 14.
Figure 17:
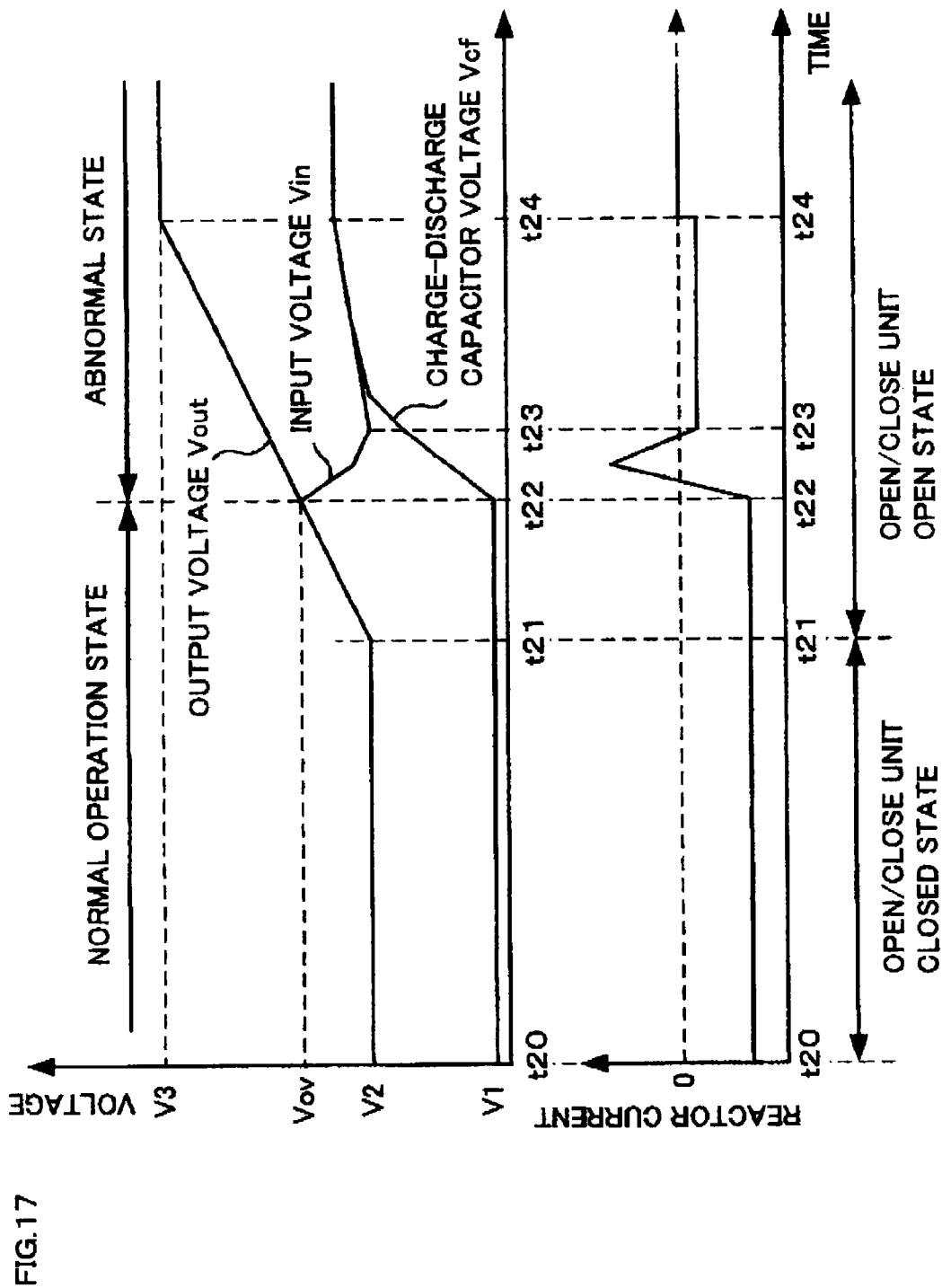
FIG. 17 is an operation explanation diagram of the control apparatus shown in FIG. 14.
Figure 18:
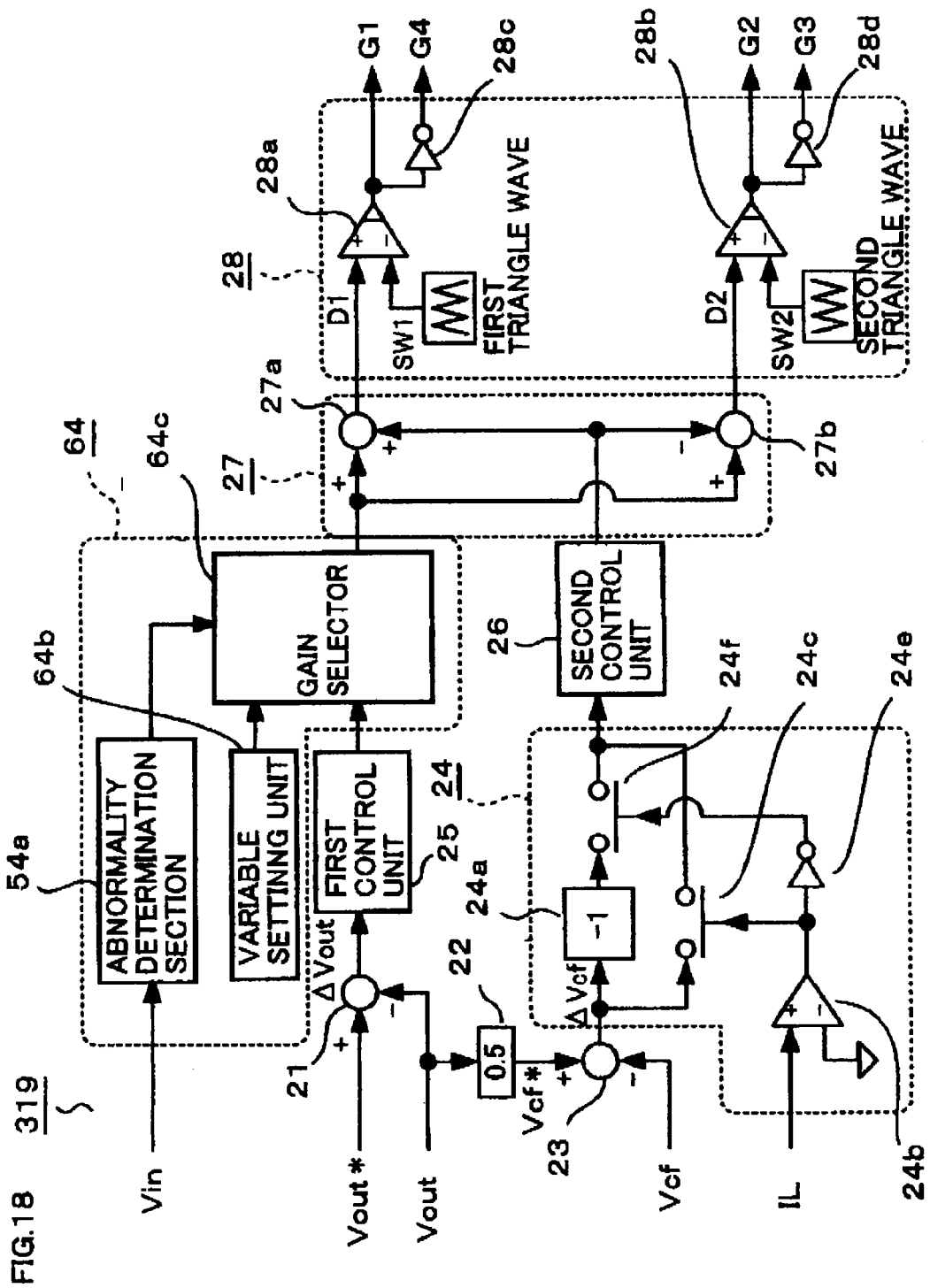
FIG. 18 is a circuit diagram showing the configuration of another control apparatus according to embodiment 3 of the present invention.
Figure 19:
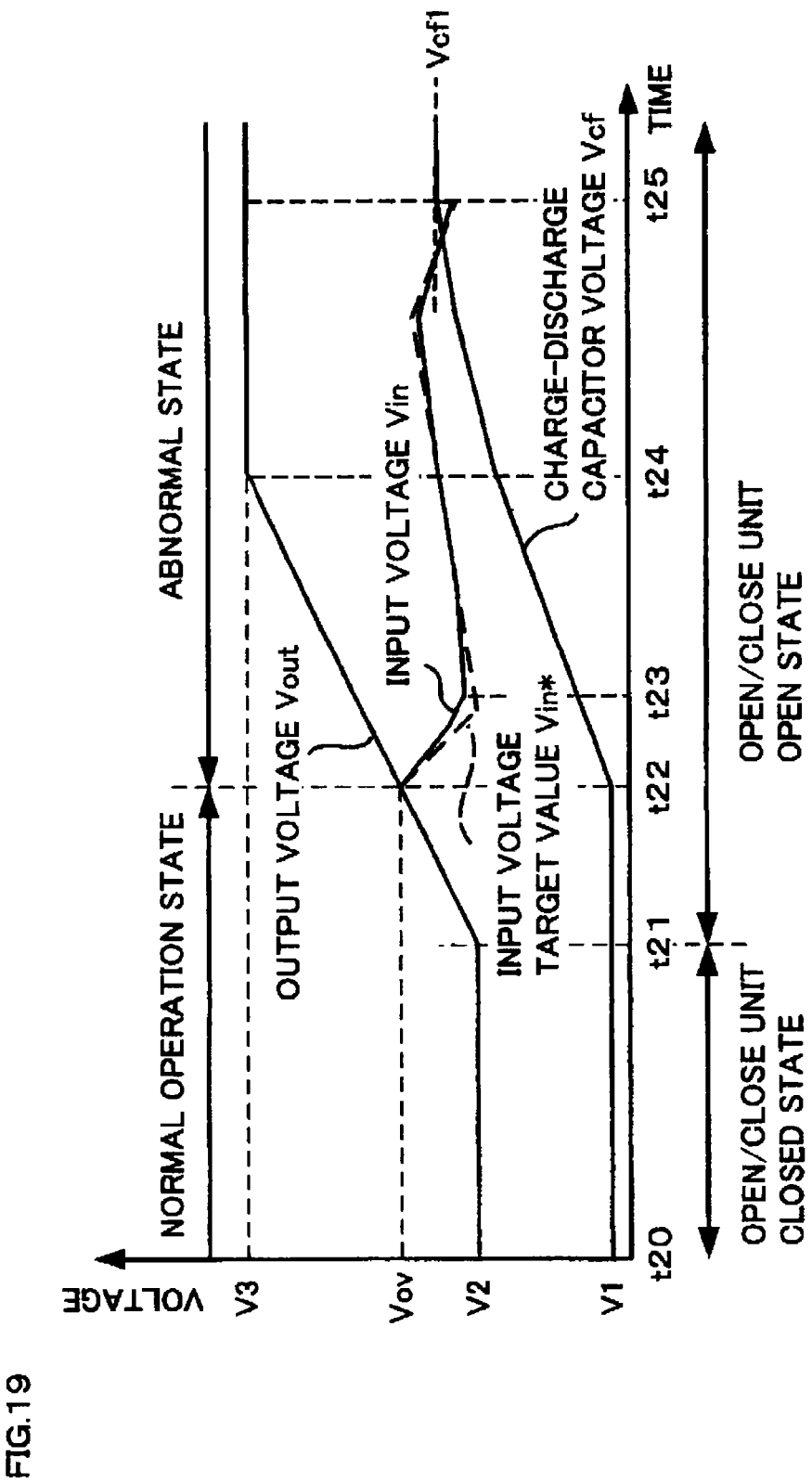
FIG. 19 is an operation explanation diagram of the control apparatus shown in FIG. 18.
Figure 20:
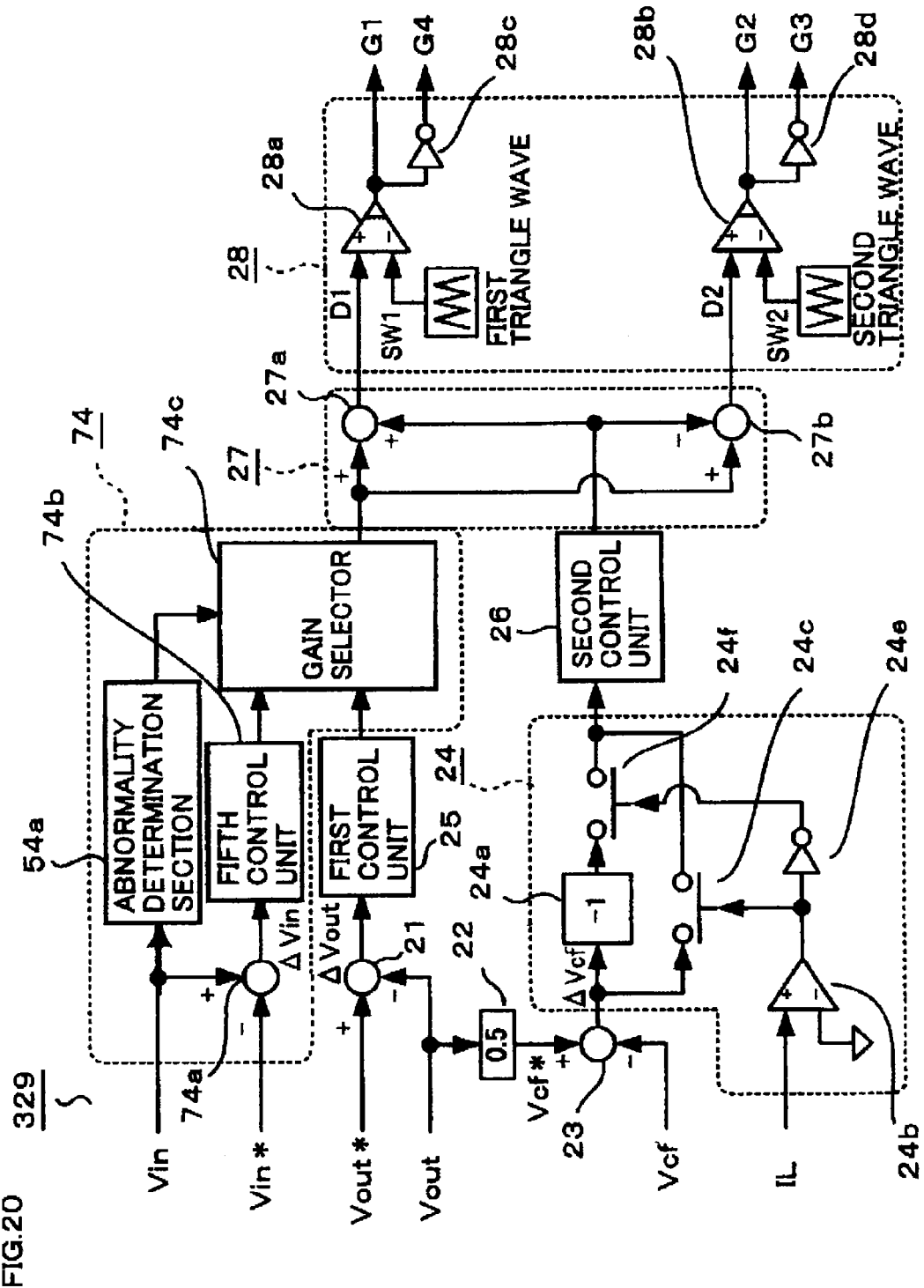
FIG. 20 is a circuit diagram showing the configuration of another control apparatus according to embodiment 3 of the present invention.
Figure 21:
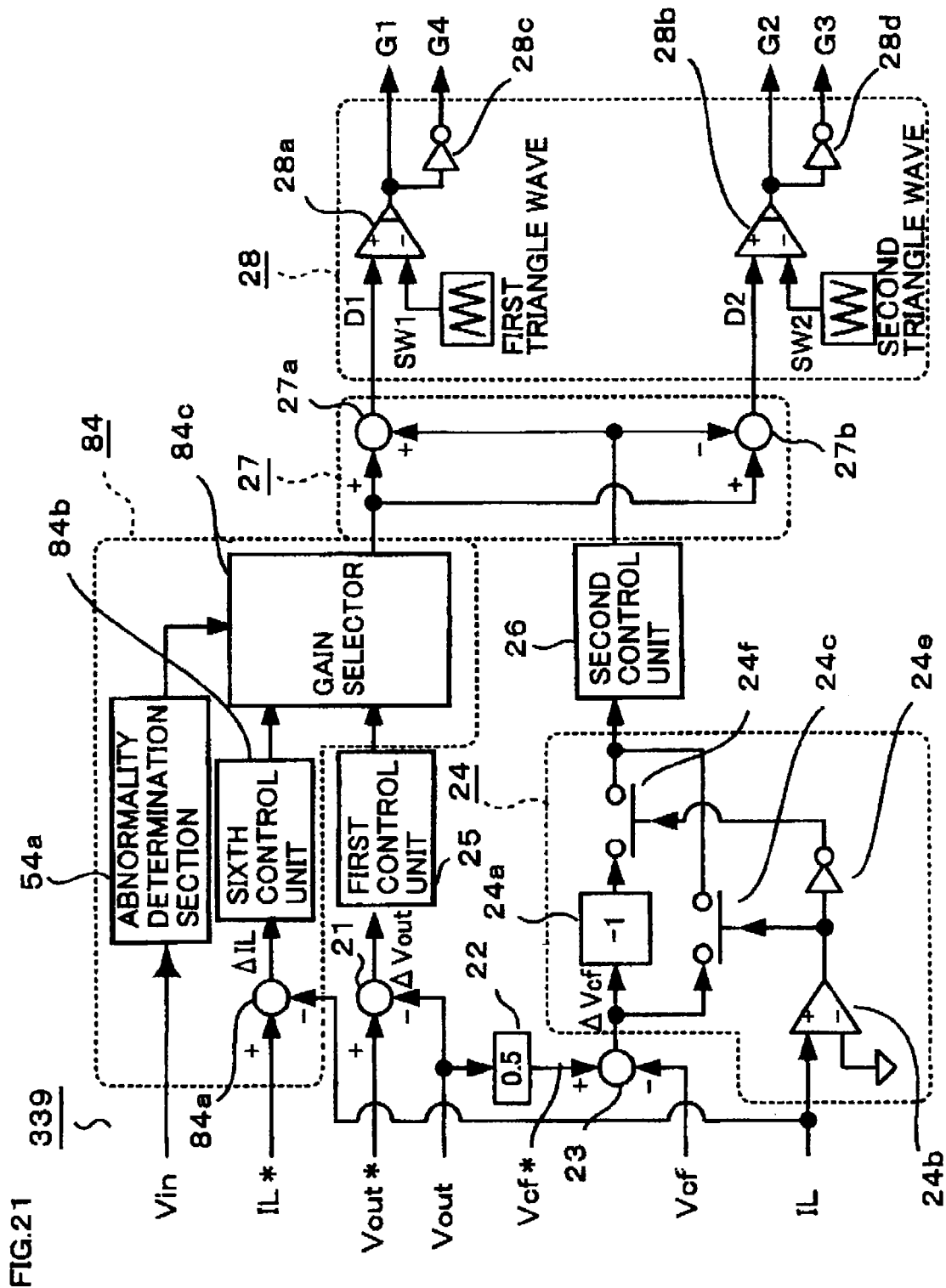
FIG. 21 is a circuit diagram showing the configuration of another control apparatus according to embodiment 3 of the present invention.

FIGS. 14 to 21 show embodiment 3 of the present invention. FIG. 14 is a configuration diagram showing the configuration of a DC/DC converter, FIG. 15 is a circuit diagram showing the configuration of a control apparatus shown in FIG. 14, FIGS. 16 and 17 are operation explanation diagrams of the control apparatus shown in FIG. 14. FIG. 18 is a circuit diagram showing the configuration of another control apparatus according to embodiment 3 of the present invention, FIG. 19 is an operation explanation diagram of the control apparatus shown in FIG. 18, FIG. 20 is a circuit diagram showing the configuration of another control apparatus, and FIG. 21 is a circuit diagram showing the configuration of still another control apparatus. In FIG. 14, the difference between a DC/DC converter 300 and the DC/DC converter 100 shown in FIG. 1 is that: the DC/DC converter 300 has a voltage sensor 107 for detecting the voltage of the low-voltage-side smoothing capacitor 11 which is the low-voltage-side voltage, that is, the input voltage Vin; an open/close unit 5 is provided between the DC/DC converter 300 and the battery 2; and a control apparatus 309 is provided.

In addition, the difference between the control apparatus 309 and the control apparatus 109 shown in FIG. 2 is that, as shown in FIG. 15, a sixth control block 54 is additionally provided. The sixth control block 54 has an abnormality determination section 54a, a setting unit 54b, and a gain selector 54c. If the abnormality determination section 54a determines that the present state is not abnormal, the gain selector 54c selects an operation value of the first control unit 25 to output the operation value as the first operation value, and if the abnormality determination section 54a determines that the present state is abnormal, the gain selector 54c selects a fixed value (for example, 0.5) set for the setting unit 54b, to output the fixed value as the first operation value. It is noted that the subtractor 21, the first control unit 25, and the sixth control block 54 correspond to the first operation section of the present invention. In addition, the gain selector 54c corresponds to a voltage control operation value changing section of the present invention.

First, operation in the case where the sixth control block 54 is not provided will be described. FIG. 16 is an operation diagram in the case where, when the output voltage target value Vout* is equal to the input voltage Vin (the step-up ratio is 1), in the regenerative operation in which the electric motor 3 operates as an electric generator to transmit energy to the battery 2, the open/close unit 5 (FIG. 14) becomes open state, that is, the connection between the battery 2 and the DC/DC converter 300 is interrupted. Such a state can occur, for example, when the battery 2 is protected in the case of full charge state or abnormal state of the battery 2.

In the period from time t10 to time t11, the open/close unit 5 is in closed state, and energy generated by the electric motor 3 charges the battery 2. When the output voltage target value Vout* is equal to the input voltage Vin (the step-up ratio is 1), since the ON duties of the switching devices S1 and S2 are both zero from the above expressions (2) and (4), the input voltage Vin and the output voltage Vout are substantially the same value as a battery voltage V2. At time t11, the open/close unit 5 becomes open state, and then energy generated by the electric motor 3 is stored in the low-voltage-side smoothing capacitor 11 and the high-voltage-side smoothing capacitor 108 (Co). Therefore, the input voltage Vin and the output voltage Vout increase to reach a maximum generated voltage V3 of the electric motor 3 at time t12. In this state, the output voltage Vout becomes higher than the output voltage target value Vout*. Therefore, in order to decrease the output voltage Vout, the control apparatus 309 operates so as to decrease both ON duties of the switching devices S1 and S2 by using the first control unit 25. Therefore, the state in which the ON duties of the switching devices S1 and S2 are both zero continues, so that the charge-discharge capacitor voltage Vcf maintains a value V1 at time t12.

As a result, voltages applied to the switching devices S2 and S3 are V1, and voltages applied to the switching devices S1 and S4 are V3−V1. Thus, the voltages applied to the switching devices are not uniform. If the maximum generated voltage V3 of the electric motor 3 is large, the voltages applied to the switching devices S1 and S4 increase, whereby overvoltage breakdown can occur. In order to prevent overvoltage breakdown, the breakdown voltage of the switching devices needs to be higher than the maximum generated voltage V3 of the electric motor 3, thus causing unnecessary cost increase or efficiency reduction.

Next, operation in the case where the sixth control block 54 is provided will be described. FIG. 17 is an operation diagram in the case where, when the output voltage target value Vout* is equal to the input voltage Vin (the step-up ratio is 1), in the regenerative operation in which the electric motor 3 generates energy to transmit the energy to the battery 2, the open/close unit 5 becomes open state.

In the period from time t20 to time t21, the open/close unit 5 is in closed state, and energy generated by the electric motor 3 charges the battery 2. At this time, a current flows in the reactor 12 in a direction from the electric motor 3 to the battery 2. When the output voltage target value Vout* is equal to the input voltage Vin (the step-up ratio is 1), since the ON duties of the switching devices S1 and 52 are both zero from expressions (2) and (4), the input voltage Vin and the output voltage Vout are substantially the same value as the battery voltage V2. At time t21, the open/close unit 5 becomes open state, and then energy generated by the electric motor 3 is stored in the low-voltage-side smoothing capacitor 11 and the high-voltage-side smoothing capacitor 108 without flowing into the battery 2. Therefore, the input voltage Vin and the output voltage Vout increase. At time t22, when the input voltage Vin has become equal to or higher than a predetermined threshold voltage Vov, the abnormality determination section 54a determines that the present state is abnormal, and the gain selector 54c selects and outputs the fixed value of 0.5, instead of the output of the first control unit 25. In the case where the gain selector 54c outputs the fixed value of 0.5, since the input voltage Vin becomes a half of the output voltage Vout in stationary state from expressions (2) and (4), the DC/DC converter operates so as to decrease the input voltage Vin.

In the middle of the period from time t22 to time t23 until the input voltage Vin reaches a half of the output voltage Vout, the reactor current IL flowing in the reactor 12 changes from negative (direction from the electric motor 3 to the low-voltage-side smoothing capacitor 11, regenerative operation) to positive (power running operation), and then becomes negative again. In the period from time t21 to time t23, since the charge-discharge capacitor voltage Vcf is equal to or lower than the charge-discharge capacitor voltage target value Vcf* (Vcf*=half of output voltage Vout), in order to increase the charge-discharge capacitor voltage Vcf, the ON duty D1 of the switching device S1 is increased and the ON duty D2 of the switching device S2 is decreased by the second control unit 26. In the period from time t23 to time t24 until the input voltage Vin reaches a half of the output voltage Vout, the reactor current IL flowing in the reactor 12 is negative (regenerative operation), so that a current flows in a direction from the electric motor 3 to the battery 2. As shown in FIG. 17, when the charge-discharge capacitor voltage Vcf is lower than the charge-discharge capacitor voltage target value Vcf*, in order to increase the charge-discharge capacitor voltage Vcf, the ON duty D1 of the switching device S1 is decreased and the ON duty D2 of the switching device S2 is increased by the second control unit 26. Thus, the charge-discharge capacitor voltage Vcf after time t24 can be controlled to be a constant value that is 50% of the output voltage Vout.

By the above operation, even in the case where the open/close unit 5 becomes open state in the regenerative operation, it becomes possible to control the charge-discharge capacitor voltage Vcf so as to be a desired voltage (in the present embodiment, a constant value that is 50% of the output voltage Vout), whereby the voltages applied to the switching devices S1 to S4 can be uniformed.

Although in FIG. 15, the set value for the setting unit 54*b* is 0.5, any fixed value equal to or smaller than 1.0 may be used.

As shown in FIG. 18, a seventh control block 64 is provided in a control apparatus 319. The seventh control block 64 has the abnormality determination section 54*a*, a variable setting unit 64*b*, and a gain selector 64*c*. A set value for the variable setting unit 64*b* may be a value that varies with time, instead of a fixed value, and for example, as shown in FIG. 19, the input voltage target value Vin* may be varied in the period from time t22 to time t25 at which the charge-discharge capacitor voltage Vcf reaches a desired value Vcf1. By the above operation, even in the case where the open/close unit 5 becomes open state in the regenerative operation, it becomes possible not only to control the charge-discharge capacitor voltage Vcf so as to be a desired voltage, but also to stably operate the input voltage Vin so as to be a desired voltage. It is noted that the subtractor 21, the first control unit 25, and the seventh control block 64 correspond to the first operation section of the present invention. In addition, the gain selector 64*c* corresponds to the voltage control operation value changing section of the present invention.

As shown in FIG. 20, an eighth control block 74 is provided in a control apparatus 329. The eighth control block 74 has the abnormality determination section 54*a*, a subtractor 74*a*, a fifth control unit 74*b*, and a gain selector 74*c*. If the abnormality determination section 54*a* determines that the present state is abnormal, the gain selector 74*c* selects an operation value of the fifth control unit 74*b* and outputs the operation value as the first operation value, instead of a fixed value. The fifth control unit 74*b* amplifies the difference voltage ΔVin between the input voltage target value Vin* and the input voltage Vin, and performs feedback control. Specifically, if the input voltage Vin is higher than the input voltage target value Vin*, in order to decrease the input voltage Vin, the fifth control unit 74*b* increases both ON duties of the switching devices S1 and S2 via the gain selector 74*c*, the second control block 27, and the third control block 28. On the other hand, if the input voltage Vin is lower than the input voltage target value Vin*, in order to increase the input voltage Vin, the fifth control unit 74*b* decreases both ON duties of the switching devices S1 and S2. The input voltage target value Vin* may be changed in step-like fashion or may be changed with a certain time constant, after abnormal state determination. It is noted that the subtractor 21, the first control unit 25, and the eighth control block 74 correspond to the first operation section of the present invention. In addition, the gain selector 74*c* corresponds to the voltage control operation value changing section of the present invention.

As shown in FIG. 21, a ninth control block 84 is provided in the control apparatus 339. The ninth control block 84 has the abnormality determination section 54*a*, a subtractor 84*a*, a sixth control unit 84*b*, and a gain selector 84*c*. If the abnormality determination section 54*a* determines that the present state is abnormal, the gain selector 84*c* selects an operation value of the sixth control unit 84*b* and outputs the operation value as the first operation value. If the abnormality determination section 54*a* determines that the present state is not abnormal, the gain selector 84*c* selects an operation value of the first control unit 25 and outputs the operation value as the first operation value. The sixth control unit 84*b* amplifies the difference current ΔIL between the current target value IL* and the reactor current IL of the reactor 12, and performs feedback control. Specifically, if the reactor current IL is larger than the target reactor current IL*, in order to decrease the reactor current IL, the sixth control unit 84*b* makes an output so as to decrease both ON duties of the switching devices S1 and S2 via the gain selector 84*c*, the second control block 27, and the third control block 28. On the other hand, if the reactor current IL is smaller than the target reactor current IL*, in order to increase the reactor current IL, the sixth control unit 84*b* makes an output so as to increase both ON duties of the switching devices S1 and S2. Thus, the reactor current IL is controlled so as to be the current target value IL* of the reactor 12. It is noted that the subtractor 21, the first control unit 25, and the ninth control block 84 correspond to the first operation section of the present invention. In addition, the gain selector 84*c* corresponds to the current control operation value changing section of the present invention.

By the above operation, even in the case where the open/close unit 5 becomes open state in the regenerative operation, it becomes possible not only to control the charge-discharge capacitor voltage Vcf so as to be a desired voltage, but also to stably operate the input voltage Vin so as to be a desired voltage.

Each embodiment described above has shown a DC/DC converter of step-up type which steps up the low-voltage-side voltage and outputs the stepped-up voltage, using the switching devices S1 and S2 as the first and second semiconductor circuits having switching function, and using the switching devices S3 and S4 similarly having switching function as the third and fourth semiconductor circuits. In the case of a DC/DC converter of step-down type which steps down a DC voltage, the switching devices S3 and S4 are used as the third and fourth semiconductor circuits having switching function, and the switching devices S1 and S2 similarly having switching function are used as the first and second semiconductor circuits. Also in this case, similarly, it is possible to prevent breakdown of the switching devices as the semiconductor circuits having switching function.

As described above, according to the present embodiment, even in the case where the open/close unit provided between the DC/DC converter and the battery becomes open state, the inter-terminal voltage of the charge-discharge capacitor can be always kept at a desired value, and therefore, the risk of device breakdown can be absolutely avoided even if switching devices or diodes with low breakdown voltage are used. Thus, a DC/DC converter with low cost and high efficiency can be obtained.

Embodiment 4

Figure 22:
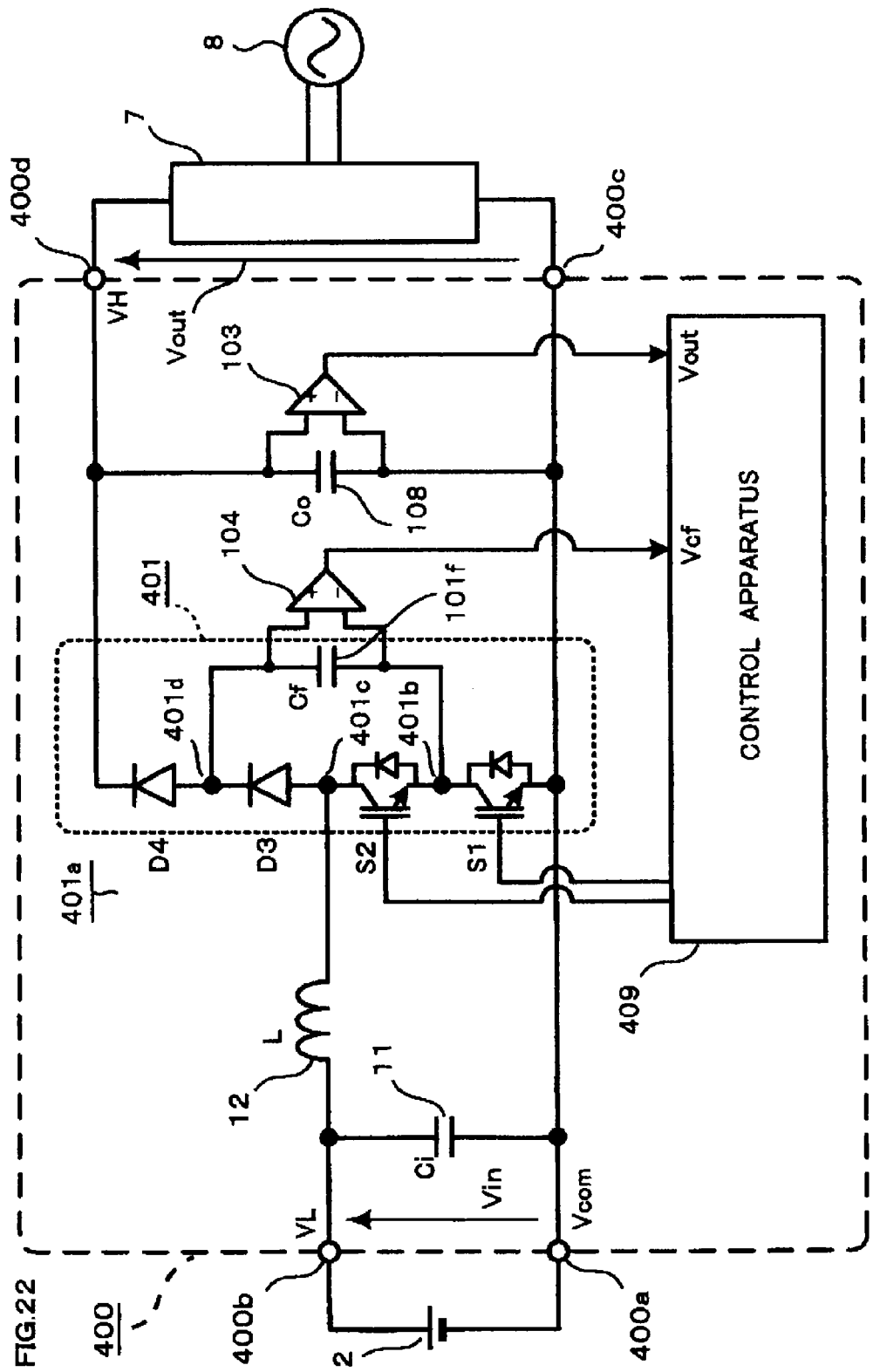
FIG. 22 is a configuration diagram showing the configuration of a DC/DC converter according to embodiment 4 of the present invention.
Figure 23:
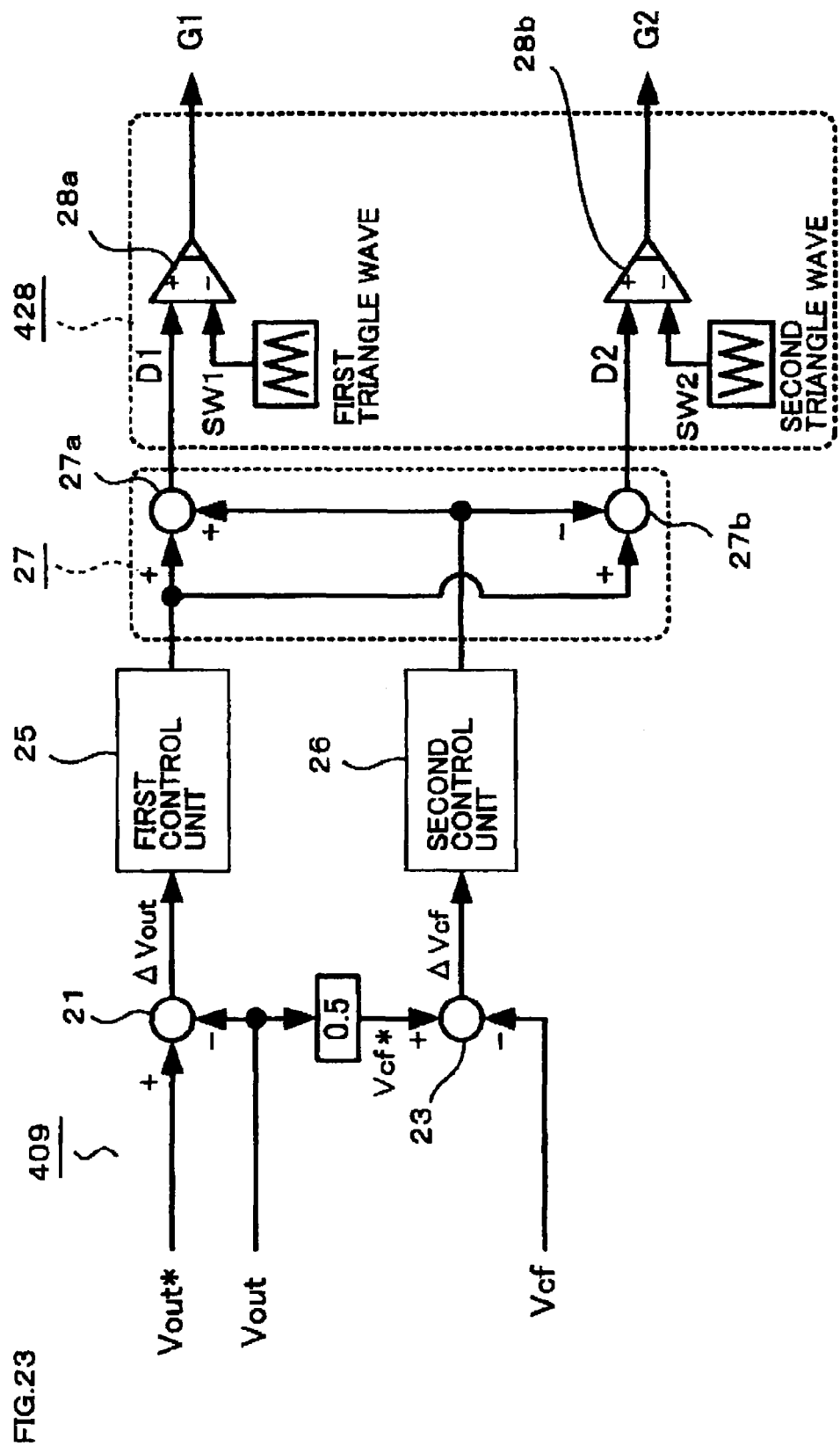
FIG. 23 is a circuit diagram showing the configuration of a control apparatus shown in FIG. 22.

FIGS. 22 and 23 show embodiment 4. FIG. 22 is a configuration diagram showing the configuration of a DC/DC converter, and FIG. 23 is a circuit diagram showing the configuration of a control apparatus shown in FIG. 22. In FIG. 22, the difference from embodiments 1 to 3 is that the DC/DC converter is a unidirectional DC/DC converter, instead of a bidirectional DC/DC converter. Unidirectional DC/DC converters include a DC/DC converter of step-up type which transmits power from the low voltage side to the high voltage side, and a DC/DC converter of step-down type which transmits power from the high voltage side to the low voltage side, and their basic operations are the same. The present embodiment shows an example using a DC/DC converter of step-up type. In FIG. 22, a DC/DC converter 400 has a first terminal 400a, a second terminal 400b, a third terminal 400c, and a fourth terminal 400d as a terminal group and as first, second, third, and fourth terminals, respectively. The DC/DC converter 400 steps up a DC input voltage Vin inputted between the first terminal 400a (Vcom) and the second terminal 400b (VL) which are low-voltage-side terminals, to a voltage equal to or higher than the input voltage Vin, and outputs the stepped-up voltage as an output voltage Vout, between the third terminal 400c (Vcom) and the fourth terminal 400d (VH) which are high-voltage-side terminals. In FIG. 22, a solar battery 6 is connected between the first terminal 400a and the second terminal 400b, and a power system 8 is connected, via a DC/AC power conversion apparatus 7, between the third terminal 400c and the fourth terminal 400d. The DC/DC converter 400 has the low-voltage-side smoothing capacitor 11 (Ci), the reactor 12 (L), a DC voltage conversion section 401, the voltage sensor 103, the voltage sensor 104, the high-voltage-side smoothing capacitor 108 (Co) on the output side, and a control apparatus 409.

The voltage of the solar battery 6 connected between the first terminal 400a and the first terminal 400b which are low-voltage-side terminals is stepped up by the DC/DC converter 400, and then outputted between the third terminal 400c and the terminal 400d which are high-voltage-side terminals. The DC/AC power conversion apparatus 7 converts a DC voltage between the third terminal 400c and the fourth terminal 400d, to an AC voltage, and transmits the AC voltage to the power system 8. The DC voltage conversion section 401 has a switching device-diode series circuit 401a as a semiconductor circuit series circuit, and the charge-discharge capacitor 101f. The switching device-diode series circuit 401a is composed of the switching devices S1 and S2 as the first and second semiconductor circuits having switching function, and two diodes D3 and D4 made of silicon carbide as the third and fourth semiconductor circuits and as unidirectional conduction devices, the switching devices S1 and S2 and the diodes D3 and D4 being connected in series in this order via a first connection part 401b, a second connection part 401c, and a third connection part 401d, respectively. The switching device-diode series circuit 401a corresponds to the switching device series circuit 101a shown in FIG. 1 in which the switching devices S3 and S4 are replaced with the diodes D3 and D4.

The emitter terminal of the switching device S1 is connected to the first terminal 400a, and the cathode side of the diode D4 is connected to the fourth terminal 400d. The second connection part 401c which is the connection part between the collector terminal of the switching device S2 and the anode side of the diode D3 is connected to the second terminal 400b via the reactor 12. One terminal of the charge-discharge capacitor 101f is connected to the first connection part 401b which is the connection part between the collector terminal of the switching device S1 and the emitter terminal of the switching device S2, and the other terminal is connected to the third connection part 401d which is the connection part between the cathode side of the diode D3 and the anode side of the diode D4. The first terminal 400a and the fourth terminal 400d are commonly connected. The control apparatus 409 generates gate signals for the two switching devices S1 and S2 in accordance with the detected values of the voltage sensors 103 and 104, thereby operating the switching devices S1 and S2.

FIG. 23 is a circuit diagram showing the detail of the control apparatus 409. In FIG. 23, the first control unit 25 amplifies the difference voltage ΔVout between the output voltage target value Vout* and the output voltage Vout, and performs feedback control for the output voltage. The second control unit 26 amplifies the difference voltage ΔVcf between the charge-discharge capacitor target value Vcf* and the charge-discharge capacitor voltage Vcf, and performs feedback control for the voltage of the charge-discharge capacitor 101f. In order to minimize the ripple current in the reactor 12, the charge-discharge capacitor target value Vcf* is set to be a half value (0.5 time) of the output voltage Vout, as in embodiment 1. The second control block 27 determines the ON duties D1 and D2 of the switching devices S1 and S2 in accordance with the output of the first control unit 25 and the output of the second control unit 26. Specifically, the second control block 27 sums the output of the first control unit 25 and the output of the second control unit 26 by using the adder 27a, to output the resultant value as the ON duty D1 of the switching device S1, and subtracts the output of the second control unit 26 from the output of the first control unit 25 by using the subtractor 27b, to output the resultant value as the ON duty D2 of the switching device S2.

A control block 428 is a PWM signal generation block. The gate signal G1 for the switching device S1 is generated by the comparator 28a comparing the ON duty D1 of the switching device S1 with the first triangle wave SW1. The gate signal G2 for the switching device S2 is generated by the comparator 28b comparing the ON duty D2 of the switching device S2 with the second triangle wave SW2. Here, in order to minimize the ripple current in the reactor 12, the phase of the second triangle wave SW2 is inverted by 180 degrees from the first triangle wave SW1. Since the other components are the same as those of embodiment 1 shown in FIG. 1, they are respectively denoted by the same reference numerals and characters.

Next, the detailed operation of the control apparatus 409 will be described. If the output voltage Vout is higher than the target output voltage Vout*, in order to decrease the output voltage Vout, the ON duties D1 and D2 of the switching devices S1 and S2 are both decreased by the output of the first control unit 25 being decreased. On the other hand, if the output voltage Vout is lower than the target output voltage Vout*, in order to increase the output voltage Vout, the ON duties of the switching devices S1 and S2 are both increased by the output of the first control unit 25 being increased.

If the charge-discharge capacitor voltage Vcf of the charge-discharge capacitor 101f is higher than the target charge-discharge capacitor voltage Vcf*, in order to decrease the charge-discharge capacitor voltage Vcf, the ON duty D1 of the switching device S1 is decreased and the ON duty D2 of the switching device S2 is increased by the output of the second control unit 26 being decreased. If the charge-discharge capacitor voltage Vcf is lower than the target charge-discharge capacitor voltage Vcf*, in order to increase the charge-discharge capacitor voltage Vcf, the ON duty D1 of the switching device S1 is increased and the ON duty D2 of the switching device S2 is decreased by the output of the second control unit 26 being increased.

By the above control, it becomes possible to control the output voltage Vout so as to be the target output voltage Vout*, and to control the charge-discharge capacitor voltage Vcf so as to be the target charge-discharge capacitor voltage Vcf*. In addition, since power is unidirectionally transmitted, the current sensor 105 (FIG. 1) and the first control block 24 (FIG. 2) of embodiment 1 are not needed. Therefore, the cost of the DC/DC converter can be reduced.

Embodiment 5

Figure 24:
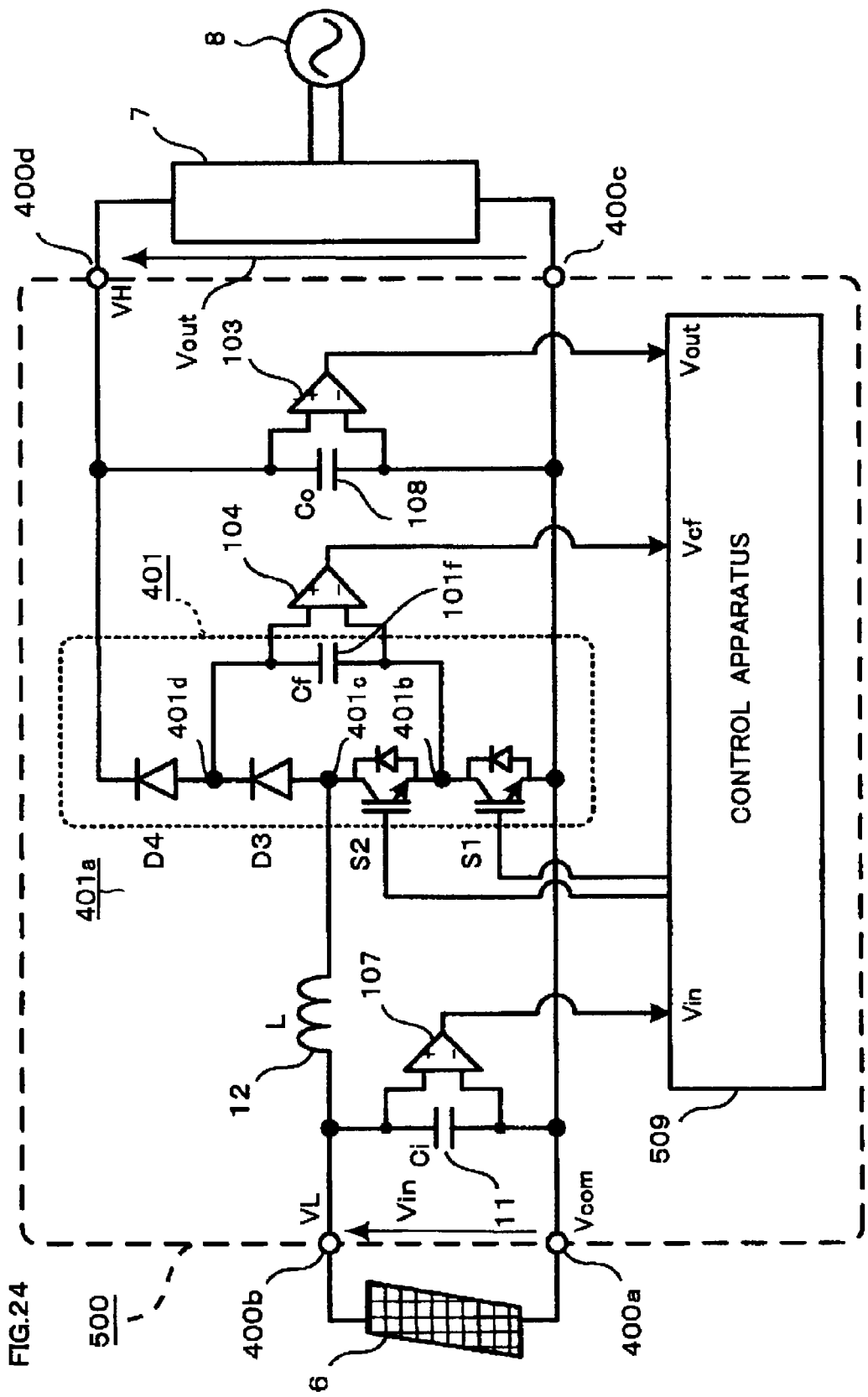
FIG. 24 is a configuration diagram showing the configuration of a DC/DC converter according to embodiment 5 of the present invention.
Figure 25:
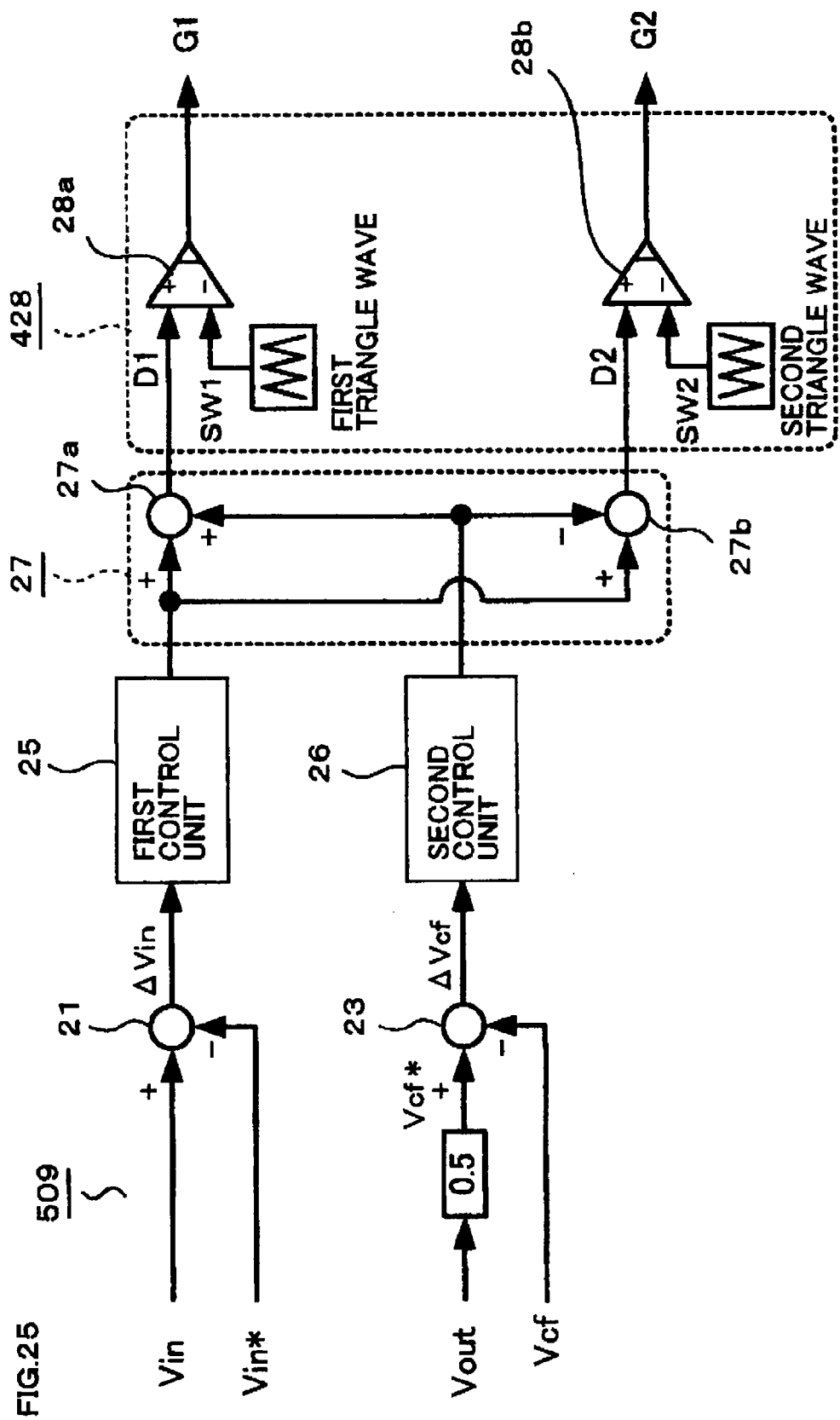
FIG. 25 is a circuit diagram showing the configuration of a control apparatus shown in FIG. 24.
Figure 26:
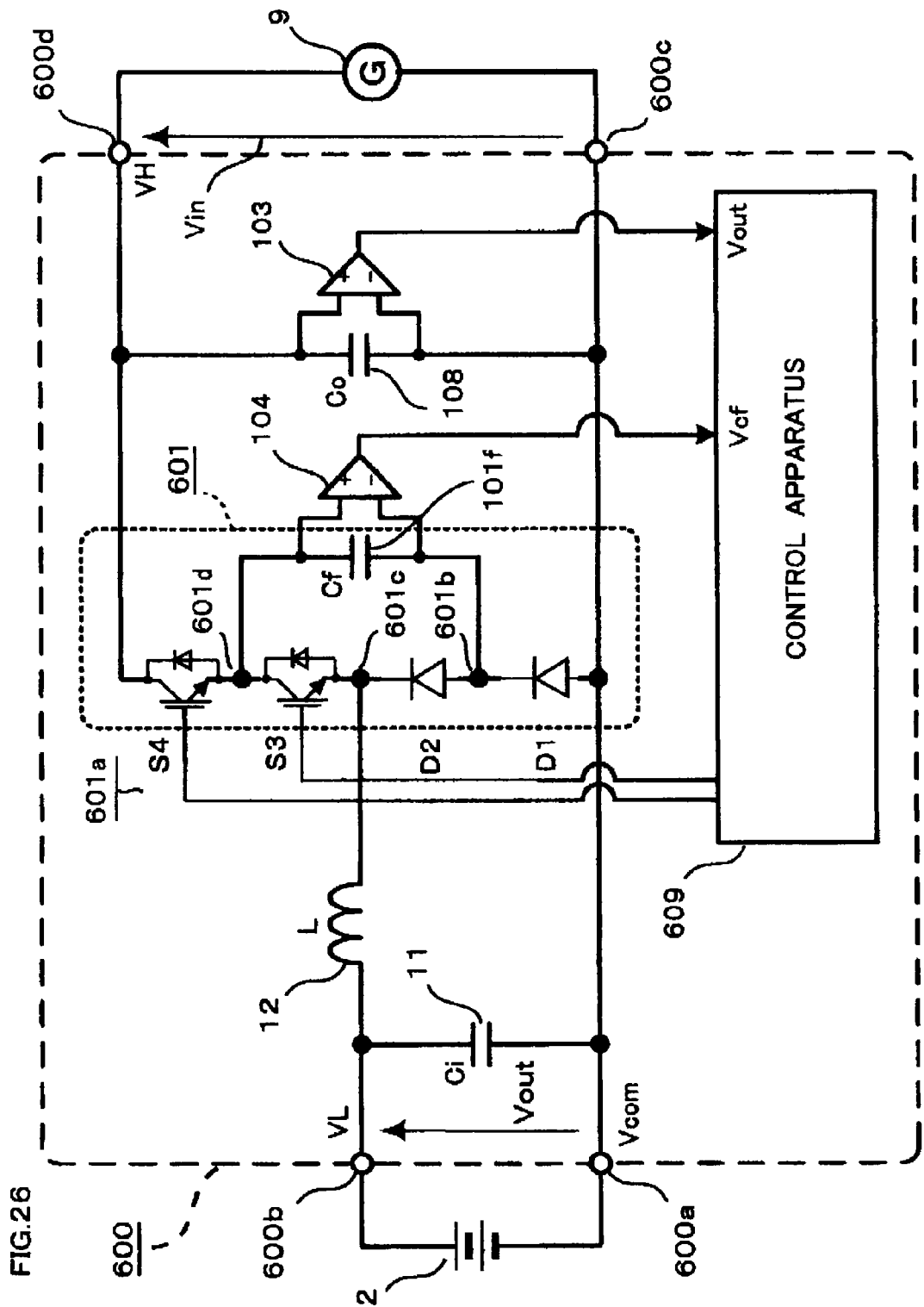
FIG. 26 is a configuration diagram showing the configuration of a DC/DC converter of step-down type.

FIGS. 24 to 26 show embodiment 5. FIG. 24 is a configuration diagram showing the configuration of a DC/DC converter, FIG. 25 is a circuit diagram showing the configuration of a control apparatus shown in FIG. 24, and FIG. 26 is a configuration diagram showing the configuration of a DC/DC converter of step-down type. A DC/DC converter 500 of the present embodiment steps up the voltage of the solar battery 6 connected between the first terminal 400a (Vcom) and the second terminal 400b (VL) which are low-voltage-side terminals, and outputs the stepped-up voltage between the third terminal 400c (Vcom) and the fourth terminal 400d (VH) which are high-voltage-side terminals, and this step-up operation is the same as in embodiment 4. However, the control target is the voltage between the first terminal 400a and the second terminal 400b which are low-voltage-side terminals, instead of the voltage between the third terminal 400c and the fourth terminal 400d which are high-voltage-side terminals. The reason is as follows. Since power that can be generated by the solar battery 6 greatly depends on the voltage (operation voltage) of the solar battery 6, the known solar battery voltage is controlled to be the input voltage target value Vin* that maximizes the output, whereby power that can be generated is maximized.

In FIG. 24, the DC/DC converter 500 has a control apparatus 509. The control apparatus 509 controls the input voltage (low-voltage-side voltage) so as to be the input voltage target value Vin*, and controls the output voltage (DC voltage) Vout which is the stepped-up voltage so as to be a desired value. The DC/AC power conversion apparatus 7 calculates an output current corresponding to the output voltage Vout, and meanwhile, converts the output voltage Vout between the third terminal 400c and the fourth terminal 400d which are high-voltage-side terminals, to an AC voltage, to supply power to the power system 8. The control apparatus 509 generates the gate signals G1 and G2 for the two switching devices S1 and S2 in accordance with the detected values of the voltage sensors 103 and 104, thereby operating the switching devices S1 and S2.

FIG. 25 shows the detailed circuit of the control apparatus 509. The first control unit 25 amplifies the difference voltage ΔVin between the input voltage target value Vin* and the input voltage Vin, and performs feedback control for the input voltage. The second control unit 26 amplifies the difference voltage ΔVcf between the charge-discharge capacitor target value Vcf* and the charge-discharge capacitor voltage Vcf, and performs feedback control for the charge-discharge capacitor voltage Vcf. In order to minimize the ripple current in the reactor 12, the charge-discharge capacitor target value Vcf* is set to be a half value (0.5 time) of the output voltage Vout. Since the other components are the same as those of embodiment 4 shown in FIG. 23, they are respectively denoted by the same reference numerals and characters, and the description thereof is omitted.

Next, the detailed operation of the control apparatus 509 will be described. If the input voltage Vin is higher than the input voltage target value Vin*, in order to decrease the input voltage Vin, the ON duties of the switching devices S1 and S2 are both decreased by the output of the first control unit 25 being decreased. On the other hand, if the input voltage Vin is lower than the input voltage target value Vin*, in order to increase the input voltage Vin, the ON duties of the switching devices S1 and 52 are both increased by the output of the first control unit 25 being increased.

If the charge-discharge capacitor voltage Vcf is higher than the target charge-discharge capacitor voltage Vcf*, in order to decrease the charge-discharge capacitor voltage Vcf, the ON duty D1 of the switching device S1 is decreased and the ON duty D2 of the switching device S2 is increased by the output of the second control unit 26 being decreased. If the charge-discharge capacitor voltage Vcf is lower than the target charge-discharge capacitor voltage Vcf*, in order to increase the charge-discharge capacitor voltage Vcf, the ON duty D1 of the switching device S1 is increased and the ON duty D2 of the switching device S2 is decreased by the output of the second control unit 26 being increased.

By the above control, it becomes possible to control the input voltage Vin so as to be the input voltage target value Vin*, and to control the charge-discharge capacitor voltage Vcf so as to be the target charge-discharge capacitor voltage Vcf*. In addition, since power is unidirectionally transmitted, for example, the current sensor 105 (FIG. 1) and the first control block 24 (FIG. 2) of embodiment 1 are not needed. Therefore, it becomes possible to configure the control apparatus of the DC/DC converter with low cost. It is noted that in the above embodiments 4 and 5, synchronous rectification circuits may be used instead of the diodes D3 and D4.

As described above, FIGS. 22 and 24 show a DC/DC converter of step-up type which steps up the low-voltage-side voltage and outputs the stepped-up voltage, using the switching devices S1 and S2 as the first and second semiconductor circuits having switching function, and using the diodes D3 and D4 as the third and fourth semiconductor circuits and as unidirectional conduction devices. However, also a DC/DC converter 600 of step-down type which steps down a DC voltage as shown in FIG. 26 provides the same effect. In FIG. 26, the DC/DC converter 600 has: a first terminal 600a, a second terminal 600b, a third terminal 600c, and a fourth terminal 600d as a terminal group and as first, second, third, and fourth terminals, respectively; a DC voltage conversion section 601; and a control apparatus 609. In addition, the same battery 2 as that shown in FIG. 1 is connected between the first terminal 600a and the second terminal 600b, and a DC electric generator 9 is connected between the third terminal 600c and the fourth terminal 600d. The input voltage Vin from the electric generator 9, inputted between the third terminal 600c (Vcom) and the fourth terminal 600d (VH) which are high-voltage-side terminals, is stepped down and outputted as the output voltage Vout between the first terminal 600a (Vcom) and the second terminal 600b (VL) which are low-voltage-side terminals, thereby charging the battery 2. Since the other components are the same as those shown in FIG. 22, they are respectively denoted by the same reference numerals and characters, and the description thereof is omitted.

The DC voltage conversion section 601 has a switching device-diode series circuit 601a as a semiconductor-circuit series circuit, and the charge-discharge capacitor 101f. The switching device-diode series circuit 601a is composed of two diodes D1 and D2 made of silicon carbide as first and second semiconductor circuits and as unidirectional conduction devices, and the switching devices S3 and S4 as third and fourth semiconductor circuits having switching function, the diodes D1 and D2 and the switching devices S3 and S4 being connected in series in this order via a first connection part 601b, a second connection part 601c, and a third connection part 601d, respectively. The switching device-diode series circuit 601a corresponds to the switching device series circuit 101a shown in FIG. 1 in which the switching devices S1 and S2 are replaced with the diodes D1 and D2. The control apparatus 609 is different from the control apparatus 409 shown in FIG. 22 in that the control apparatus 609 controls switching of the switching devices S3 and S4 so as to perform step-down operation. However, similarly, the output voltage Vout is controlled to be the target output voltage Vout*, and the charge-discharge capacitor voltage Vcf is controlled to be the target charge-discharge capacitor voltage Vcf*. Also in this case, similarly, it is possible to prevent breakdown of the switching devices S3 and S4 as the semiconductor circuits having switching function and the diodes D1 and D2 as semiconductor circuit.

The above control apparatuses 409 and 509 may be combined with the fourth control block 34 shown in FIG. 8, the fifth control block 44 shown in FIG. 10, the subtractor 52 shown in FIG. 12, or the subtractor 52 and the fifth control block 44 shown in FIG. 13. The control apparatus 609 may include the sixth control block 54 shown in FIG. 15, the seventh control block 64 shown in FIG. 18, the eighth control block 74 shown in FIG. 20, or the ninth control block 84 shown in FIG. 21.

Although in the above embodiments, the switching devices S1 to S4 are IGBTs and the diodes D3 and D4 are made of silicon carbide, the switching devices may be MOSFETs, JFETs, or the like. In addition, the switching devices or the diode devices may be made of a wide bandgap semiconductor having a wider bandgap than silicon. Examples of wide bandgap semiconductors include silicon carbide (SiC), gallium-nitride-based materials, and diamond. Since a switching device or a diode device (diode) made of such a wide bandgap semiconductor has a high breakdown voltage and a high allowable current density, the sizes of the switching devices or the diode devices can be reduced, and by using the small-sized switching devices or diode devices, the size of a semiconductor module that includes these devices can be reduced. In addition, since such devices have high heat resistance, the size of a radiation fin of a heat sink can be reduced and a water-cooling unit can be replaced by an air-cooling type. Therefore, the size of the semiconductor module can be further reduced. Moreover, since such devices have low power loss, the efficiency of the switching devices or the diode devices can be increased, and further, the efficiency of the semiconductor module can be increased. Both the switching device and the diode device may be made of wide bandgap semiconductors, or one of the switching device and the diode device may be made of a wide bandgap semiconductor, whereby the effect as described in the above embodiments can be obtained.

The invention claimed is:

1. A DC/DC converter comprising:
a low-voltage-side smoothing capacitor which retains a low-voltage-side voltage;
a high-voltage-side smoothing capacitor whose negative terminal is connected to a negative terminal of the low-voltage-side smoothing capacitor and which retains a high-voltage-side voltage;
a first semiconductor circuit one end of which is connected to the negative terminal of the low-voltage-side smoothing capacitor;
a second semiconductor circuit one end of which is connected to another end of the first semiconductor circuit, and another end of which is connected to a positive terminal of the low-voltage-side smoothing capacitor via a reactor;
a third semiconductor circuit one end of which is connected to the another end of the second semiconductor circuit;
a fourth semiconductor circuit one end of which is connected to another end of the third semiconductor circuit, and another end of which is connected to a positive terminal of the high-voltage-side smoothing capacitor;
a charge-discharge capacitor one end of which is connected to an intermediate connection point between the first semiconductor circuit and the second semiconductor circuit, and another end of which is connected to another intermediate connection point between the third semiconductor circuit and the fourth semiconductor circuit; and
a control apparatus which controls each of the semiconductor circuits,
the DC/DC converter being configured to perform at least one of a step-up operation and a step-down operation,
the step-up operation causing each of the first and second semiconductor circuits to function as a switching device, and each of the third and fourth semiconductor circuits to function as a diode device, converting a voltage of the low-voltage-side smoothing capacitor that is inputted, to a stepped-up voltage, and outputting the stepped-up voltage to the high-voltage-side smoothing capacitor, by using an ON/OFF switching function as the switching device of the first and second semiconductor circuits, and
the step-down operation causing each of the third and fourth semiconductor circuits to function as a switching device, and each of the first and second semiconductor circuits to function as a diode device, converting a voltage of the high-voltage-side smoothing capacitor that is inputted, to a stepped-down voltage, and outputting the stepped-down voltage to the low-voltage-side smoothing capacitor, by using an ON/OFF switching function as the switching device of the third and fourth semiconductor circuits, wherein:
the control apparatus has a first operation section, a second operation section, and a switching control section,
the first operation section calculates a first operation value, based on a difference voltage between an instruction value for the high-voltage-side voltage and a detected value of the high-voltage-side voltage, or a difference voltage between an instruction value for the low-voltage-side voltage and a detected value of the low-voltage-side voltage,
the second operation section calculates a second operation value, based on a difference voltage between a voltage instruction value for the charge-discharge capacitor and a voltage detected value of the charge-discharge capacitor and at least one of a magnitude of a current flowing in the reactor and a direction of the current flowing in the reactor, and
the switching control section obtains a conduction ratio, based on the first operation value and the second operation value, and controls, based on the conduction ratio, switching operations of the first and second semiconductor circuits having the ON/OFF switching function or the third and fourth semiconductor circuits having the ON/OFF switching function, thereby controlling the high-voltage-side voltage or the low-voltage-side voltage, and a voltage of the charge-discharge capacitor.

2. The DC/DC converter according to claim 1, wherein the first semiconductor circuit, the second semiconductor circuit, the third semiconductor circuit, and the fourth semiconductor circuit all have switching functions, and the control apparatus controls switching of the first semiconductor circuit, the second semiconductor circuit, the third semiconductor circuit, and the fourth semiconductor circuit.

3. The DC/DC converter according to claim 1, wherein when the first and second semiconductor circuits have a switching function, the third and fourth semiconductor circuits are unidirectional conduction devices or synchronous rectification circuits, and when the third and fourth semiconductor circuits have a switching function, the first and second semiconductor circuits are unidirectional conduction devices or synchronous rectification circuits.

4. The DC/DC converter according to claim 1, wherein the switching control section obtains the conduction ratio, based on an addition value between the first operation value and the second operation value, and a subtraction value between the first operation value and the second operation value.

5. The DC/DC converter according to claim 1, further comprising a reactor current determination section which determines the magnitude of the current flowing in the reactor, wherein
the second operation section changes a magnitude of the second operation value in accordance with a result of the determination by the reactor current determination section.

6. The DC/DC converter according to claim 1, further comprising a current sensor which detects the current flowing in the reactor, wherein
the second operation section has a second operation value adjustment section which adjusts a magnitude of the second operation value in accordance with the magnitude of the current flowing in the reactor detected by the current sensor.

7. The DC/DC converter according to claim 1, further comprising a current sensor which detects the current flowing in the reactor, wherein
the first operation section calculates the first operation value such that the magnitude of the current flowing in the reactor detected by the current sensor becomes a current target value of the reactor, the current target value of the reactor being calculated on a basis of a difference voltage between an instruction value for the high-voltage-side voltage and a detected value of the high-voltage-side voltage, or a difference voltage between an instruction value for the low-voltage-side voltage and a detected value of the low-voltage-side voltage.

8. The DC/DC converter according to claim 7, wherein the second operation section has a second operation value adjustment section which adjusts a magnitude of the second operation value in accordance with the magnitude of the current flowing in the reactor.

9. A DC/DC converter comprising:
a low-voltage-side smoothing capacitor which retains a low-voltage-side voltage;
a high-voltage-side smoothing capacitor whose negative terminal is connected to a negative terminal of the low-voltage-side smoothing capacitor and which retains a high-voltage-side voltage;
a first semiconductor circuit one end of which is connected to the negative terminal of the low-voltage-side smoothing capacitor;
a second semiconductor circuit one end of which is connected to another end of the first semiconductor circuit, and another end of which is connected to a positive terminal of the low-voltage-side smoothing capacitor via a reactor;
a third semiconductor circuit one end of which is connected to the another end of the second semiconductor circuit;
a fourth semiconductor circuit one end of which is connected to another end of the third semiconductor circuit, and another end of which is connected to a positive terminal of the high-voltage-side smoothing capacitor;
a charge-discharge capacitor one end of which is connected to an intermediate connection point between the first semiconductor circuit and the second semiconductor circuit, and another end of which is connected to another intermediate connection point between the third semiconductor circuit and the fourth semiconductor circuit; and
a control apparatus which controls each of the semiconductor circuits,
the DC/DC converter being configured to perform a step-down operation,
the step-down operation causing each of the third and fourth semiconductor circuits to function as a switching device, and each of the first and second semiconductor circuits to function as a diode device, converting a voltage of the high-voltage-side smoothing capacitor that is inputted, to a stepped-down voltage, and outputting the stepped-down voltage to the low-voltage-side smoothing capacitor, by using an ON/OFF switching function as the switching device of the third and fourth semiconductor circuits, wherein:
the control apparatus has a first operation section, a second operation section, and a switching control section,
the first operation section calculates a first operation value, based on a difference voltage between an instruction value for the high-voltage-side voltage and a detected value of the high-voltage-side voltage, or a difference voltage between an instruction value for the low-voltage-side voltage and a detected value of the low-voltage-side voltage,
the second operation section calculates a second operation value, based on a difference voltage between a voltage instruction value for the charge-discharge capacitor and a voltage detected value of the charge-discharge capacitor, and
the switching control section obtains a conduction ratio, based on the first operation value and the second operation value, and controls, based on the conduction ratio, switching operations of the first and second semiconductor circuits having the ON/OFF switching function or the third and fourth semiconductor circuits having the ON/OFF switching function, thereby controlling the high-voltage-side voltage or the low-voltage-side voltage, and a voltage of the charge-discharge capacitor, wherein
the first operation section has a voltage control operation value changing section which, when an electric apparatus is connected to a low voltage side and then the connection of the electric apparatus is interrupted during an operation, outputs another operation value as the first operation value, instead of the first operation value, such that the low-voltage-side voltage becomes a desired voltage.

10. The DC/DC converter according to claim 9, wherein
the voltage control operation value changing section, when the electric apparatus is connected to the low voltage side and then the connection of the electric apparatus is interrupted during the operation, outputs the another operation value, instead of the first operation value, such that the low-voltage-side voltage becomes a desired constant voltage.

11. The DC/DC converter according to claim 9, wherein
the voltage control operation value changing section, when the electric apparatus is connected to the low voltage side and then the connection of the electric apparatus is interrupted during the operation, outputs the another operation value such that the low-voltage-side voltage has another value different from that of the low-voltage-side voltage just before the interruption of the connection of the electric apparatus.

12. The DC/DC converter according to claim 9, wherein
an instruction value for the low-voltage-side voltage is instructed, and the voltage control operation value changing section, when the electric apparatus is connected to the low voltage side and then the connection of the electric apparatus is interrupted during the operation, outputs the another operation value such that the low-voltage-side voltage coincides with the instruction value for the low-voltage-side voltage.

13. The DC/DC converter according to claim 9, wherein
the electric apparatus is a battery.

14. A DC/DC converter comprising:
a low-voltage-side smoothing capacitor which retains a low-voltage-side voltage;
a high-voltage-side smoothing capacitor whose negative terminal is connected to a negative terminal of the low-voltage-side smoothing capacitor and which retains a high-voltage-side voltage;
a first semiconductor circuit one end of which is connected to the negative terminal of the low-voltage-side smoothing capacitor;
a second semiconductor circuit one end of which is connected to another end of the first semiconductor circuit, and another end of which is connected to a positive terminal of the low-voltage-side smoothing capacitor via a reactor;
a third semiconductor circuit one end of which is connected to the another end of the second semiconductor circuit;
a fourth semiconductor circuit one end of which is connected to another end of the third semiconductor circuit and another end of which is connected to a positive terminal of the high-voltage-side smoothing capacitor;
a charge-discharge capacitor one end of which is connected to an intermediate connection point between the first semiconductor circuit and the second semiconductor circuit, and another end of which is connected to another intermediate connection point between the third semiconductor circuit and the fourth semiconductor circuit; and
a control apparatus which controls each of the semiconductor circuits,
the DC/DC converter being configured to perform a step-down operation,
the step-down operation causing each of the third and fourth semiconductor circuits to function as a switching device, and each of the first and second semiconductor circuits to function as a diode device, converting a voltage of the high-voltage-side smoothing capacitor that is inputted, to a stepped-down voltage, and outputting the stepped-down voltage to the low-voltage-side smoothing capacitor, by using an ON/OFF switching function as the switching device of the third and fourth semiconductor circuits, wherein:
the control apparatus has a first operation section, a second operation section, and a switching control section,
the first operation section calculates a first operation value, based on a difference voltage between an instruction value for the high-voltage-side voltage and a detected value of the high-voltage-side voltage, or a difference voltage between an instruction value for the low-voltage-side voltage and a detected value of the low-voltage-side voltage,
the second operation section calculates a second operation value, based on a difference voltage between a voltage instruction value for the char e-discharge capacitor and a voltage detected value of the charge-discharge capacitor, and
the switching control section obtains a conduction ratio, based on the first operation value and the second operation value, and controls, based on the conduction ratio, switching operations of the first and second semiconductor circuits having the ON/OFF switching function or the third and fourth semiconductor circuits having the ON/OFF switching function, thereby controlling the high-voltage-side voltage or the low-voltage-side voltage, and a voltage of the charge-discharge capacitor, wherein
the first operation section has a current control operation value changing section which, when an electric apparatus is connected to the low voltage side and then the connection of the electric apparatus is interrupted during an operation, outputs another operation value, instead of the first operation value, such that a desired current flows from the reactor to the low-voltage-side smoothing capacitor.

15. The DC/DC converter according to claim 14, wherein
the current control operation value changing section, when the electric apparatus is connected to the low voltage side and then the connection of the electric apparatus is interrupted during the operation, outputs the another operation value such that a current flowing from the reactor to the low-voltage-side smoothing capacitor coincides with a reactor current instruction value which is an instruction for the current flowing in the reactor.

16. The DC/DC converter according to claim 14, wherein
the electric apparatus is a battery.

17. The DC/DC converter according to claim 1, further comprising a reactor current direction detection section which detects a direction of a current flowing in the reactor, wherein
the second operation section changes a polarity of the second operation value in accordance with a result of the detection by the reactor current direction detection section.

18. The DC/DC converter according to claim 17, wherein
the reactor current direction detection section detects the direction of the current flowing in the reactor, based on a switching-relevant inter-terminal voltage of one of the first semiconductor circuit, the second semiconductor circuit, the third semiconductor circuit, and the fourth semiconductor circuit, in which a current flows and that has a switching function.

19. The DC/DC converter according to claim 17, wherein the reactor current direction detection section detects the direction of the current flowing in the reactor, based on an operation state of the semiconductor circuits and a voltage change of the charge-discharge capacitor.

20. The DC/DC converter according to claim 1, wherein the semiconductor circuits have semiconductor devices made of a wide bandgap semiconductor.

21. The DC/DC converter according to claim 20, wherein the wide bandgap semiconductor is silicon carbide, gallium-nitride-based material, or diamond.

* * * * *